(12) United States Patent
Nagy et al.

(10) Patent No.: US 11,236,286 B2
(45) Date of Patent: Feb. 1, 2022

(54) MECHANICAL PURIFICATION OF TRIACYLGLYCERIDE OILS

(71) Applicant: SOCIETE DES PRODUITS NESTLE S.A., Vevey (CH)

(72) Inventors: Kornel Nagy, La Tour-de-Peilz (CH); Marine Nicolas, Lausanne (CH); Sabine Lahrichi, Montreux (CH); Karine Meisser Redeuil, Pully (CH); Xanthippi Theurillat, Cheseaux-sur-Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/980,563

(22) PCT Filed: Mar. 13, 2019

(86) PCT No.: PCT/EP2019/056309
§ 371 (c)(1),
(2) Date: Sep. 14, 2020

(87) PCT Pub. No.: WO2019/175258
PCT Pub. Date: Sep. 19, 2019

(65) Prior Publication Data
US 2021/0002580 A1 Jan. 7, 2021

(30) Foreign Application Priority Data

Mar. 14, 2018 (EP) .................................. 18161660
Oct. 11, 2018 (EP) .................................. 18199763
Dec. 19, 2018 (EP) .................................. 18214128

(51) Int. Cl.
*C11B 3/00* (2006.01)
*B01D 21/26* (2006.01)
(Continued)

(52) U.S. Cl.
CPC .............. *C11B 3/001* (2013.01); *B01D 21/02* (2013.01); *B01D 21/262* (2013.01); *C11B 3/006* (2013.01);
(Continued)

(58) Field of Classification Search
CPC . C11B 3/001; C11B 3/006; C11B 3/04; C11B 3/16; C11B 1/10; B01D 11/00; B01D 11/04; B01D 21/262; B01D 21/02
See application file for complete search history.

(56) References Cited

U.S. PATENT DOCUMENTS 2,223,077 A 11/1940 Stadt
9,115,333 B2 * 8/2015 Kase ....................... C11B 3/001
(Continued)

FOREIGN PATENT DOCUMENTS

EP 2594625 5/2013
EP 2716746 4/2014
(Continued)

*Primary Examiner* — Yate' K Cutliff
(74) *Attorney, Agent, or Firm* — K&L Gates LLP

(57) ABSTRACT

A method for purification of a triacylglyceride oil comprising the steps of concentrating the insoluble components in the melted triacylglyceride oil, by applying a centrifugational force on the liquid triacylglyceride oil whilst maintaining the triacylglyceride oil above its melting temperature; and/or allowing the insoluble components to settle by gravitational force whilst maintaining the triacylglyceride oil above its melting temperature; and separating the triacylglyceride oil from the insoluble components. A triacylglyceride oil obtained by the method of the invention for use in food production is also provided.

12 Claims, 21 Drawing Sheets

(51) Int. Cl.
  *B01D 21/01* (2006.01)
  *C11B 3/16* (2006.01)
  *C11B 7/00* (2006.01)
  *B01D 21/02* (2006.01)
  *A23D 9/04* (2006.01)
  *C11B 1/10* (2006.01)

(52) U.S. Cl.
  CPC .............. *C11B 3/16* (2013.01); *C11B 7/0075* (2013.01); *A23D 9/04* (2013.01); *C11B 1/10* (2013.01)

(56) References Cited

U.S. PATENT DOCUMENTS

| | | | |
|---|---|---|---|
| 9,765,281 B2 * | 9/2017 | Bruse | ....................... C11B 3/001 |
| 2014/0018559 A1 * | 1/2014 | Nagy | ....................... C11B 3/10 |
| | | | 554/21 |
| 2016/0230199 A1 | 8/2016 | Ikemoto et al. | |
| 2017/0042174 A1 * | 2/2017 | Bruse | ....................... A23L 5/21 |

FOREIGN PATENT DOCUMENTS

| | | | | |
|---|---|---|---|---|
| EP | 2716746 A1 * | 4/2014 | .............. | C11B 1/06 |
| EP | 3098292 | 11/2016 | | |
| EP | 3098292 A1 * | 11/2016 | .............. | C11B 3/00 |
| WO | 2013163112 | 10/2013 | | |
| WO | 2014081279 | 5/2014 | | |
| WO | WO-2014081279 A1 * | 5/2014 | ............ | A23L 33/115 |
| WO | WO 2017/035403 * | 3/2017 | .............. | C11B 3/00 |

\* cited by examiner

MECHANICAL PURIFICATION OF TRIACYLGLYCERIDE OILS

CROSS REFERENCE TO RELATED APPLICATIONS

The present application is a National Stage of International Application No. PCT/EP2019/056309, filed on Mar. 13, 2019, which claims priority to European Patent Application No. 18161660.8, filed on Mar. 14, 2018, European Patent Application No. 18199763.6, filed on Oct. 11, 2018, and European Patent Application No. 18214128.3, filed Dec. 19, 2018, the entire contents of which are being incorporated herein by reference.

FIELD OF THE INVENTION

The present invention relates to the purification of oils. In particular, the invention relates to the mechanical purification of triacylglyceride oils from contaminant chlorinated precursors of monochloropropandiol esters (MCPDEs) and/or MCPDEs themselves.

BACKGROUND TO THE INVENTION

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47).

3-MCPD was originally found in acid-hydrolysed vegetable protein (acid-HVP; Z. Lebensm.-Unters. Forsch. (1978) 167: 241-244). More recently, it was found that refined edible oils may contain 3-MCPD in its fatty acid ester form, but only very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It has been reported that chlorination of acylglycerides can occur at very high temperatures, for example during the final step of the oil refining process, or deodorisation, under which oils may be heated under vacuum (3-7 mbar) up to 260-270° C. This may result in the formation of fatty acid esters of MCPD.

Effective mitigation routes for MCPD esters are limited and pose a challenge to the plant oil refining industry. Currently, the presence of 3-MCPD in refined oils is carefully monitored and oils with 3-MCPD content above a threshold value are discarded in order to ensure full compliance with EFSA recommendations. One key complication hindering effective mitigation of these contaminants is that the chlorine carrying precursors are not removed before the deodorisation step and thus can act as the source/donor of chlorine during the deodorisation step.

As 3-MCPD may occur in many refined commercially important oils, such as plant oils, there exists a significant need for improved methods for removing and/or avoiding the production of such contaminants during oil refining.

SUMMARY OF THE INVENTION

The inventors have developed a method by which MCPD ester generation during the process of oil refining can be substantially reduced or prevented.

The inventors have developed a method for the removal or reduction of certain chlorinated substances from crude or partially refined vegetable oils. This purification process has a positive impact on the ultimately derived, heat treated oils MCPD content.

The principle of the method is to deploy a gravitational and/or centrifugal force based mechanical step that allows the physical separation of the chlorinated substances from the oil subject to purification. As a result, the chlorinated substances are enriched in the sedimented fraction of the oil and can be thus separated from the oil to be refined. The method of the invention can be applied to crude or partially refined triacylglycerol (also called triacylglycride) oils which include but are not limited to palm oil, palm stearin, palm olein and their various fractions, palm kernel oil, coconut oil, sunflower oil, high oleic sunflower oil and their variants, canola/rapeseed oil, soybean oil, fish oil, algae oil, cocoa butter and any mixtures/blends thereof.

The mechanical treatment can include centrifugation and/or settling either before, in between or after any other purification, refining or deodorization step.

Once removed, the potential chlorine donors are no longer available for the generation of chlorinated compounds, such as MCPD esters and MCPD di-esters during the heating steps in oil refinement. Product oils low in chlorinated substances are thereby obtained and the purified oils may be subjected to various refining practices, such as heat treatment and deodorisation, in order to produce refined oils low in or free from MCPDEs.

Further benefits of the method of the invention is that it enables lower temperatures to be used in deodorisation of the oil, which both
1) reduces trans-fatty acid formation (trans fat formation at high temperature is reviewed in Baley's industrial oil and fat products; Sixth Edition; Volume 5 Edible Oil and Fat Products: Processing Technologies; Chapter 8 Deodorization; section 3. Refined oil quality, subsection 3.2 Fat isomerization and degradation products).
2) reduces formation of glycidyl esters (see the summary of the elimination methods of GEs in "Glycidyl fatty acid esters in refined edible oils: a review on formation, occurrence, analysis, and elimination methods" in Comprehensive Reviews in Food Science and Food-Safety; vol. 16, 263-281; 2017).

Accordingly, in one aspect the invention provides a method for purification of a triacylglyceride oil, wherein the quantity of organic chlorinated precursors of monochloropropandiol esters (MCPDEs) is reduced in the purified triacylglyceride oil compared to the starting triacylglyceride oil, comprising the steps:
 (a) concentrating insoluble components in liquid triacylglyceride oil, for example microparticles, segregated droplets and sediments by
  (i). applying a centrifugational force on the triacylglyceride oil whilst maintaining the triacylglyceride oil above its melting temperature; and/or
  (ii). allowing the insoluble components to settle by gravitational force whilst maintaining the triacylglyceride oil above its melting temperature;
 (b) separating the triacylglyceride oil from the insoluble components.

In some embodiments, before step (a), the triacylglyceride oil is melted by heating it to above its melting temperature.

Accordingly, in one aspect the invention provides a method for purification of a triacylglyceride oil, wherein the organic quantity of chlorinated precursors of monochloropropandiol esters (MCPDEs) is reduced in the purified triacylglyceride oil compared to the starting triacylglyceride oil, comprising the steps:
- (c) melting the triacylglyceride oil by heating it to above its melting temperature;
- (d) concentrating insoluble components in liquid triacylglyceride oil, for example microparticles, segregated droplets and sediments by:
  - (i) applying a centrifugational force on the triacylglyceride oil whilst maintaining the triacylglyceride oil above its melting temperature; and/or
  - (ii) allowing the insoluble components to settle by gravitational force whilst maintaining the triacylglyceride oil above its melting temperature;
- (e) separating the triacylglyceride oil from the insoluble components.

In one embodiment, in step (a) or (d), a centrifugational force is applied on the triacylglyceride oil whilst maintaining the triacylglyceride oil above its melting temperature.

In one embodiment, in step (a) or (d), the insoluble components are allowed to settle by gravitational force whilst maintaining the triacylglyceride oil above its melting temperature.

In one embodiment, step a(ii) is performed and then step a(i) is performed.

In one embodiment, step a(i) is performed and then step a(ii) is performed.

In one embodiment, step d(ii) is performed and then step d(i) is performed.

In one embodiment, step d(i) is performed and then step d(ii) is performed.

In one embodiment the mass range of said organic chlorinated precursors is in the range of 300-1000 Dalton.

In one embodiment the mass range of said organic chlorinated precursors is in the range of 600-800 Dalton.

In one embodiment, the quantity of chlorinated precursors of monochloropropandiol esters (MCPDEs) is reduced in the purified triacylglyceride oil compared to the starting triacylglyceride oil.

In one embodiment, the starting triacylglyceride oil is crude triacylglyceride oil.

In one embodiment, the triacylglyceride oil has not been refined before step (a) or step (c). In one embodiment, the triacylglyceride oil has not been degummed before step (a) or step (c). In one embodiment, the triacylglyceride oil has not been bleached before step (a) or step (c).

In one embodiment, the triacylglyceride oil has not been fractionated before step (a) or step (c).

In a preferred embodiment, the triacylglyceride oil has not been deodorised before step (a) or step (c).

In one embodiment, the triacylglyceride oil is subjected to preliminary cleaning before step (a) or (c). In one embodiment, the triacylglyceride oil is subjected to preliminary refining before step (a) or step (c). In one embodiment, the triacylglyceride oil is subjected to fractionation before step (a) or step (c). In one embodiment, the triacylglyceride oil is subjected to hydrogenation before step (a) or step (c). In one embodiment, the triacylglyceride oil is subjected to interesterification before step (a) or step (c).

In one embodiment, the triacylglyceride oil is a plant oil, animal oil, fish oil or algal oil.

In a preferred embodiment, the triacylglyceride oil is a plant oil, preferably wherein the plant oil is selected from the group consisting of palm oil, sunflower oil, corn oil, canola oil, soybean oil, coconut oil, palm kernel oil and cocoa butter. In one embodiment, the triacylglyceride oil is palm oil. In one embodiment, the triacylglycerol oil is sunflower oil or its high oleic variants.

In one embodiment, the pH of the triacylglyceride oil is adjusted before step (a) or step (c). The pH may be adjusted before step (a) or step (c) to decrease the polarity of chlorinated precursors of MCPDEs. In one embodiment, the pH of the triacylglyceride oil is decreased by about 0.5-2.0, for example decreased by about 0.5, 1.0, 1.5 or 2.0. In another embodiment, the pH of the triacylglyceride oil is increased by about 0.5-2.0, for example increased by about 0.5, 1.0, 1.5 or 2.0.

In one embodiment, the pH of the triacylglyceride oil is adjusted by addition of citric acid or phosphoric acid. In another embodiment, the pH of the triacylglyceride oil is adjusted by addition of a bicarbonate salt or a hydroxide salt, such as sodium bicarbonate or sodium hydroxide.

In one embodiment, the triacylglyceride oil is pre-treated before step (a) or step (c), for example the triacylglyceride oil is admixed with acidified water before step (a) or step (c). Similar pH treatment steps are commonly practised in physical refining (see, for example, "Degumming of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 6. Degumming, Lecithin Processing, and Physical Refining Pretreatment). The solubilised acid content may be increased before step (a) or (c), for example to increase the protonated form and/or polarity of chlorinated precursors of MCPDEs. In one embodiment, the triacylglyceride oil is admixed with water acidified by addition of citric acid or phosphoric acid. For example, 0.1-1 wt % acid solution containing 70-85% phosphoric acid can be used.

In another embodiment, the triacylglyceride oil is admixed with a base (such as caustic soda, NaOH) or its water solution. Similar pH treatment steps are commonly practised in chemical refining/neutralisation of oils (see, for example, "Alkali refining of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 7. Caustic Refining). The solubilised base content may be introduced before step (c), for example to increase the dissociated form and/or polarity of chlorinated precursors of MCPDEs. In one embodiment, the triacylglyceride oil is admixed with water containing a bicarbonate salt or a hydroxide salt, such as sodium bicarbonate or sodium hydroxide.

In another embodiment, the triacylglyceride oil is pre-treated before step (a) or (c) with a combination of both acidic and basic water treatment (e.g. as the previously described acidic and basic water treatments).

In one embodiment, the acid/base content of the triacylglyceride oil is adjusted under high-shear mixing.

In one embodiment, the method further comprises one or more of the following steps subsequent to step (b) or to step (e):
- (f) one or more processes selected from the group consisting of physical or chemical refining, degumming, neutralization and bleaching;
- (g) optionally deodorising the product of step (f), preferably wherein the deodorising is vacuum steam deodorising; and
- (h) optionally fractionating the product of step (f) or (g).

In another aspect, the invention provides a purified triacylglyceride oil obtainable by the method of the invention.

In one embodiment, the purification reduces the quantity of chlorinated precursors of monochloropropandiol esters (MCPDEs) in the purified triacylglyceride oil compared to the starting triacylglyceride oil.

There is also provided a purified triacylglyceride oil according to the invention, for use in the production of a food product.

There is also provided a food product, produced by using a purified triacylglyceride oil according to the invention.

Removal of chlorinated precursors of MCPDEs at m/z 702.61807; 718.61357 and 734.60809 in crude solvent extracted palm oil. The signal intensities for all three precursors without centrifugation were set as 100%. Then, the signals of the same precursors are plotted after direct centrifugation and centrifugation after a 6 hour settling period at 40° C. (effect of settling+centrifugation).

FIGS. 2 to 5

Figure 2:
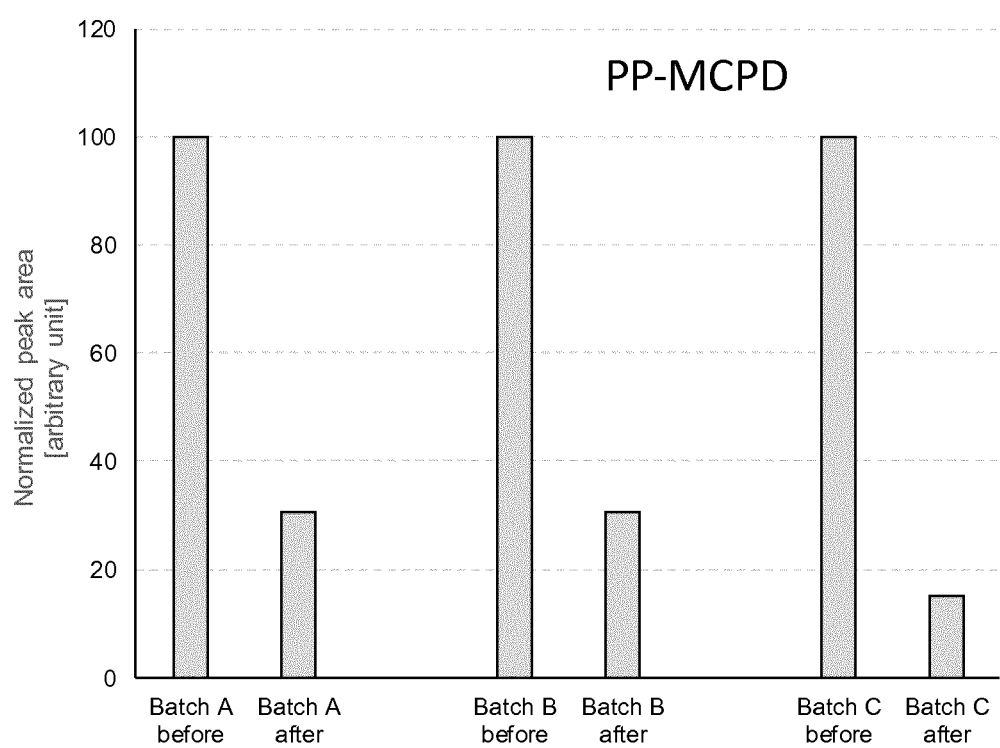
Figure 3:
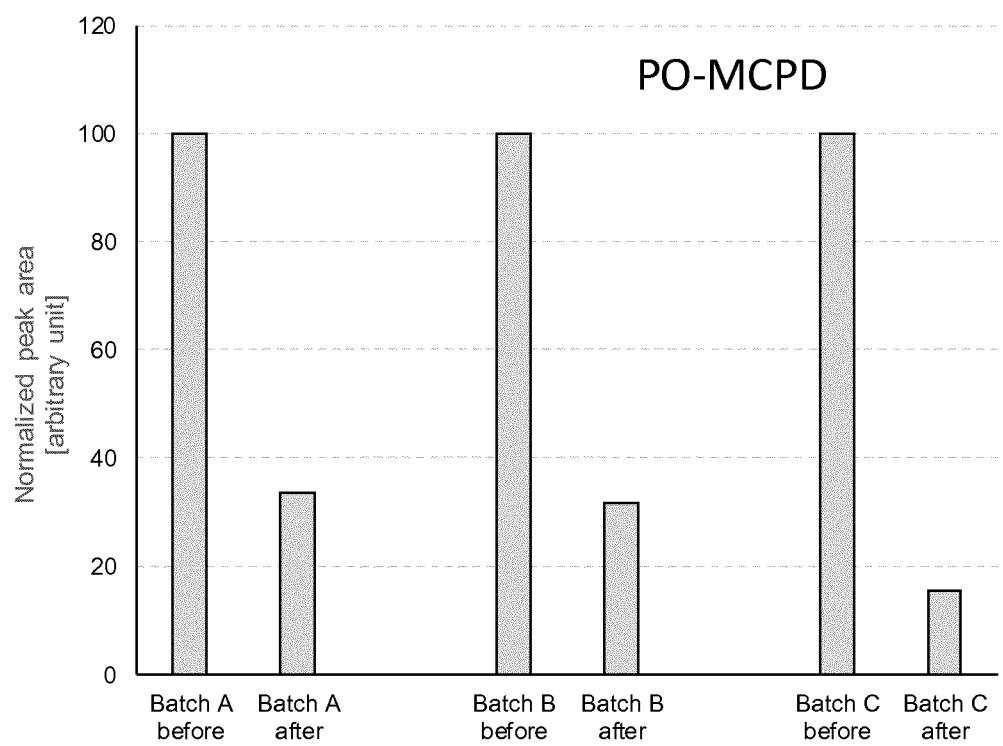
Figure 4:
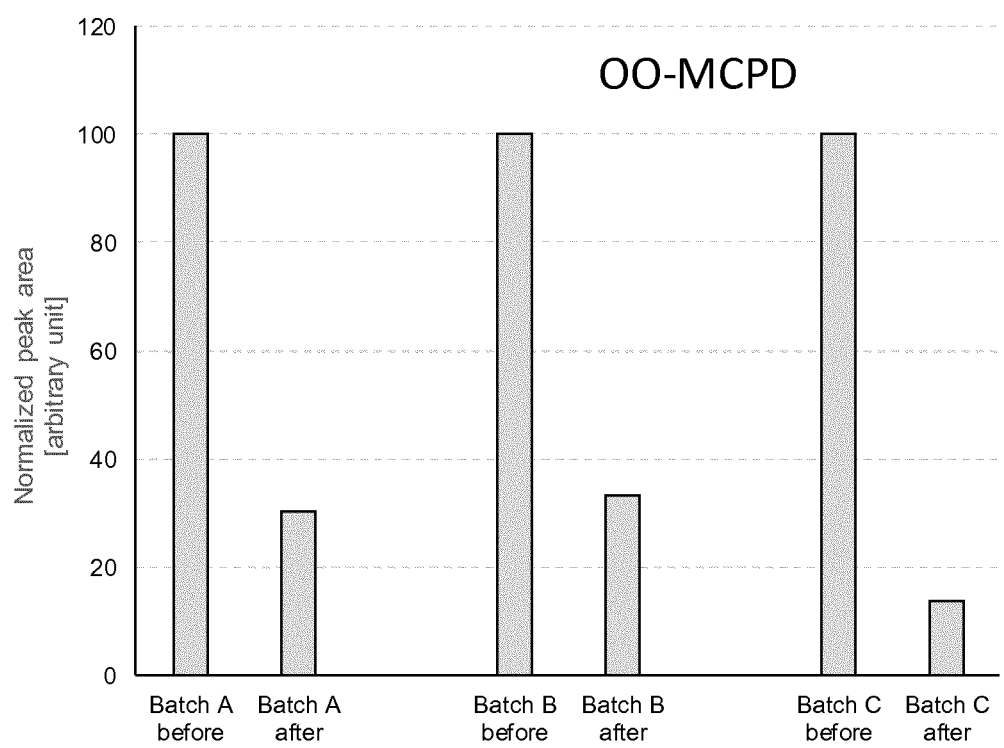
Figure 5:
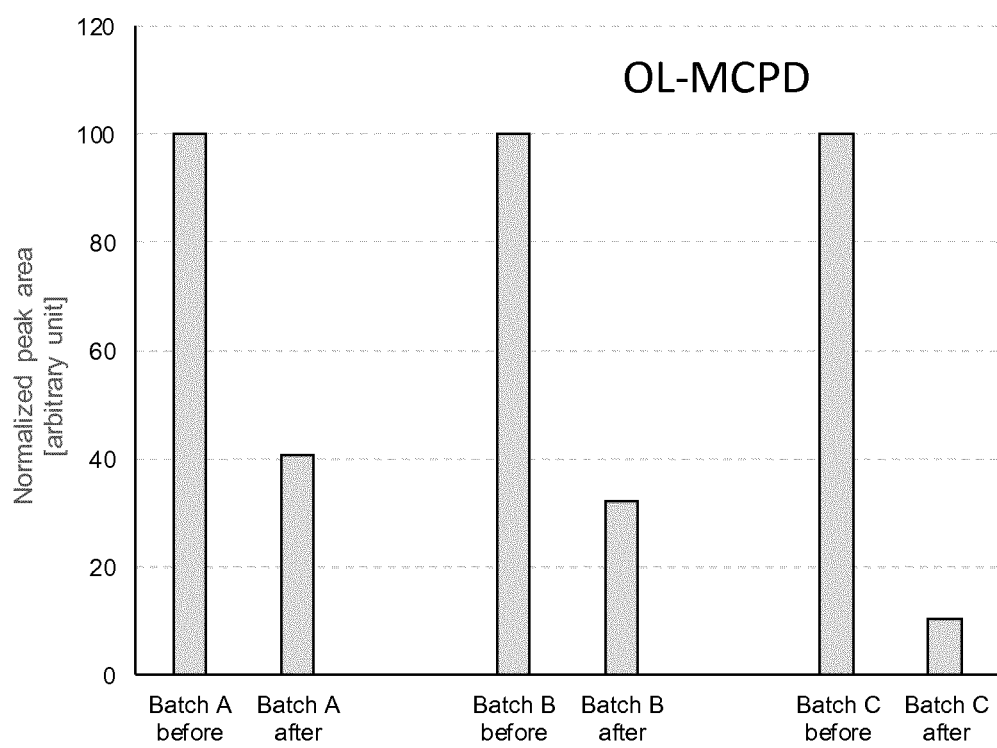

The beneficial effect of the centrifugation based mitigation is shown in FIG. 2 (dipalmitoyl-MCPD, PP-MCPD), FIG. 3 (palmitoyl-oleyl-MCPD), FIG. 4 (dioleyl-MCPD) and FIG. 5 (oleyl-linoleyl-MCPD).

Figure 6:
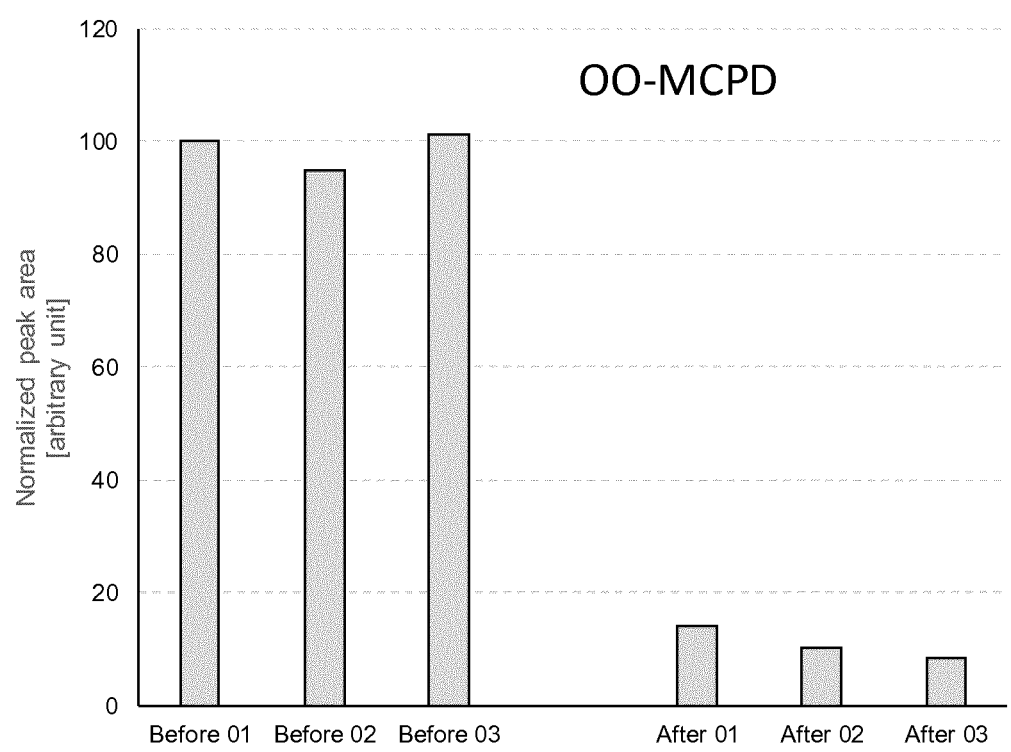
Figure 7:
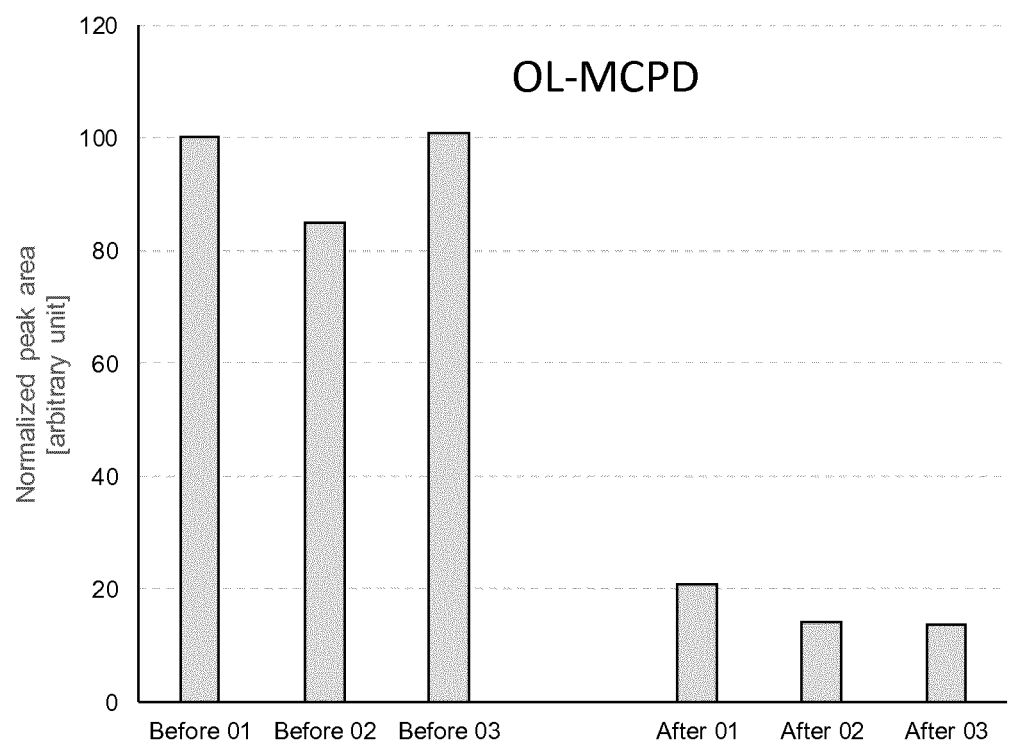
Figure 8:
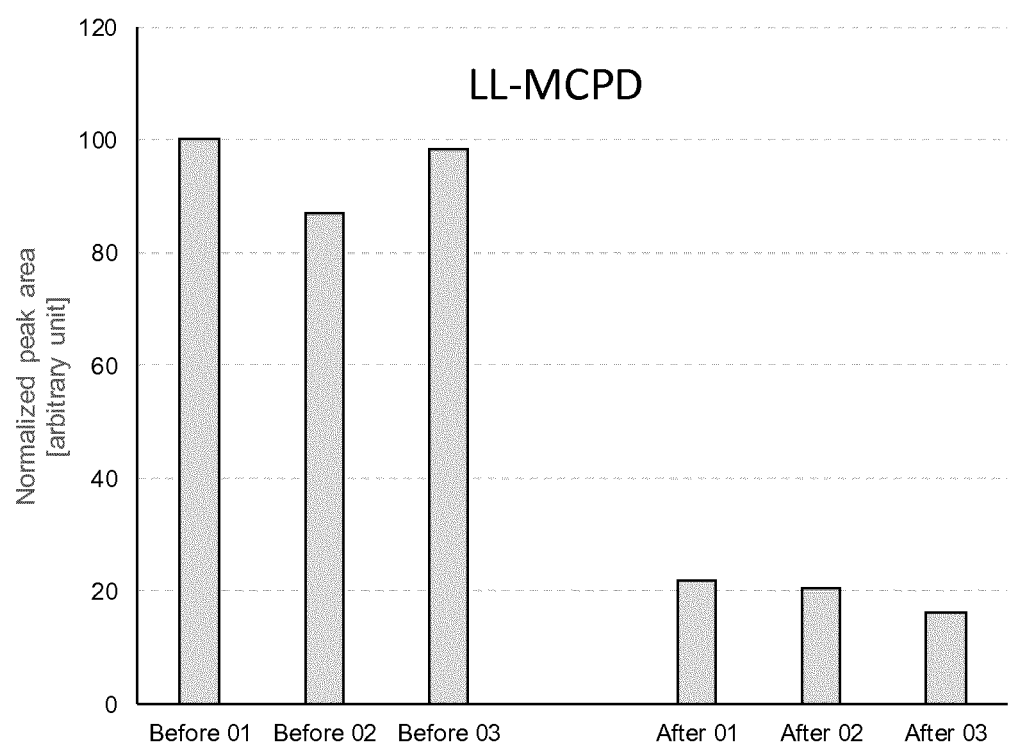

FIGS. 6 to 8

The beneficial effect of the centrifugation based mitigation is shown FIG. 6 (dioleyl-MCPD), FIG. 7 (oleyl-linoleyl-MCPD) and FIG. 8 (dilinoleyl-MCPD).

Figure 9:
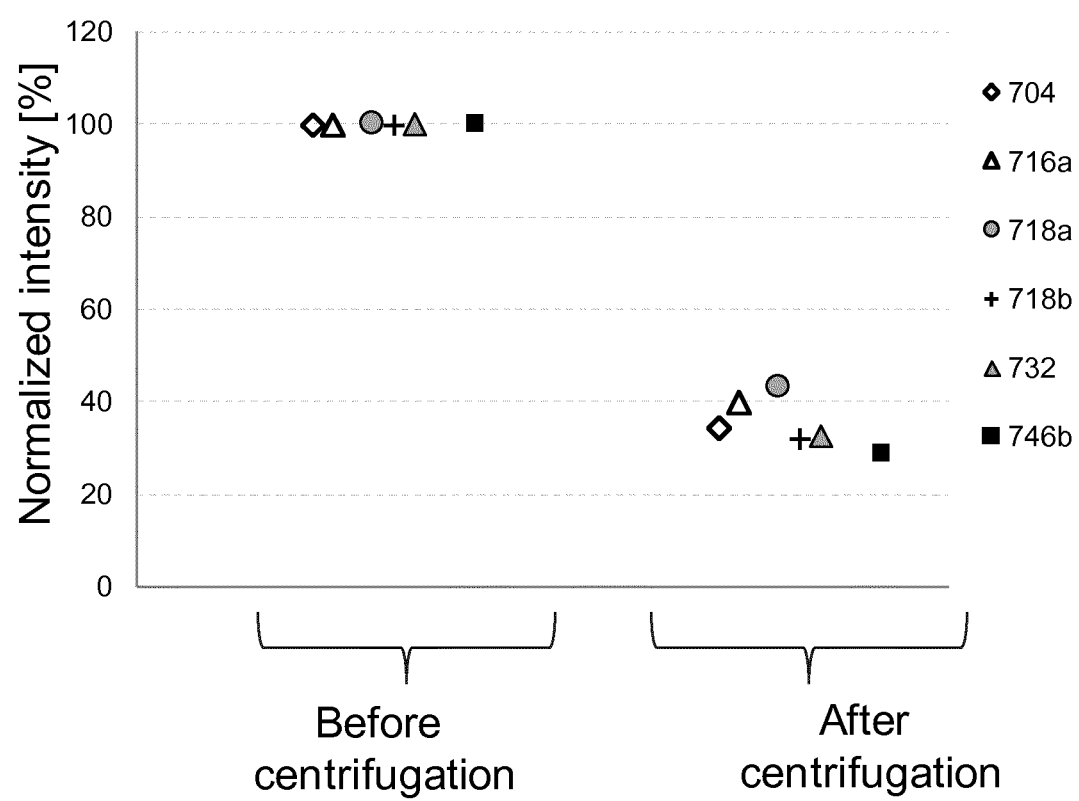

FIG. 9—Removal of chlorinated precursors with centrifugation from "solvent extracted crude canola seed oil".

Figure 10:
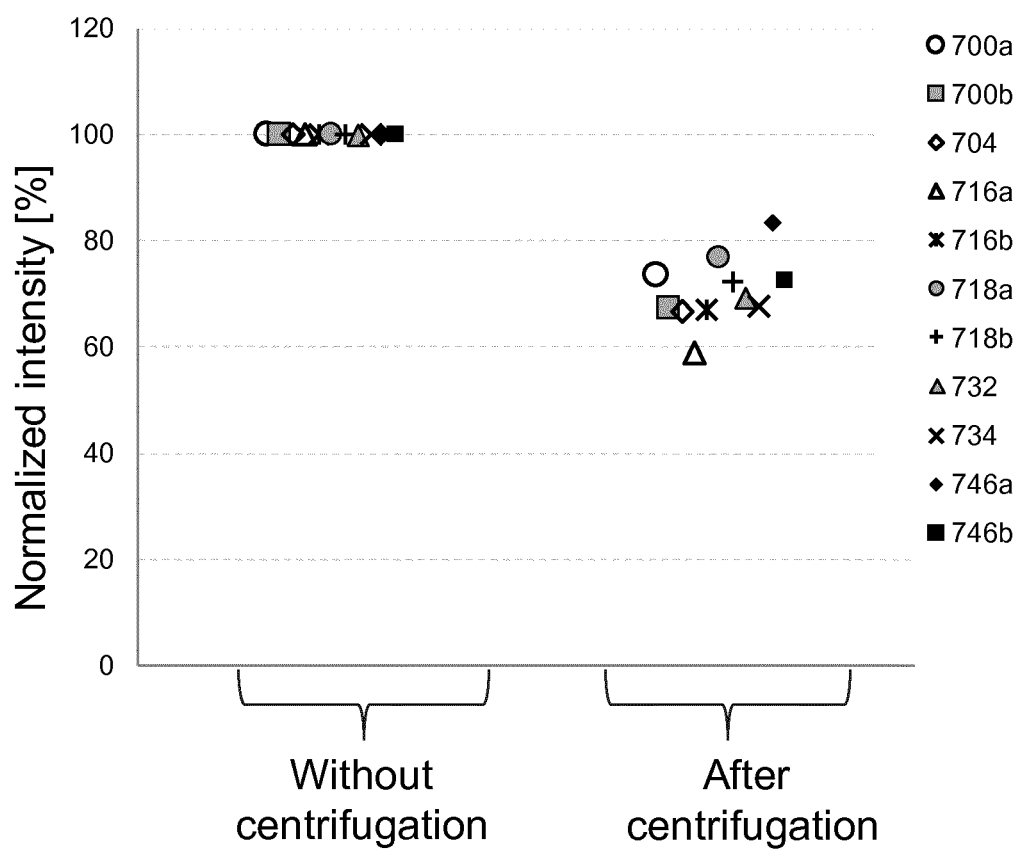

FIG. 10—Removal of chlorinated precursors with centrifugation from "industrially produced crude palm oil".

Figure 11:
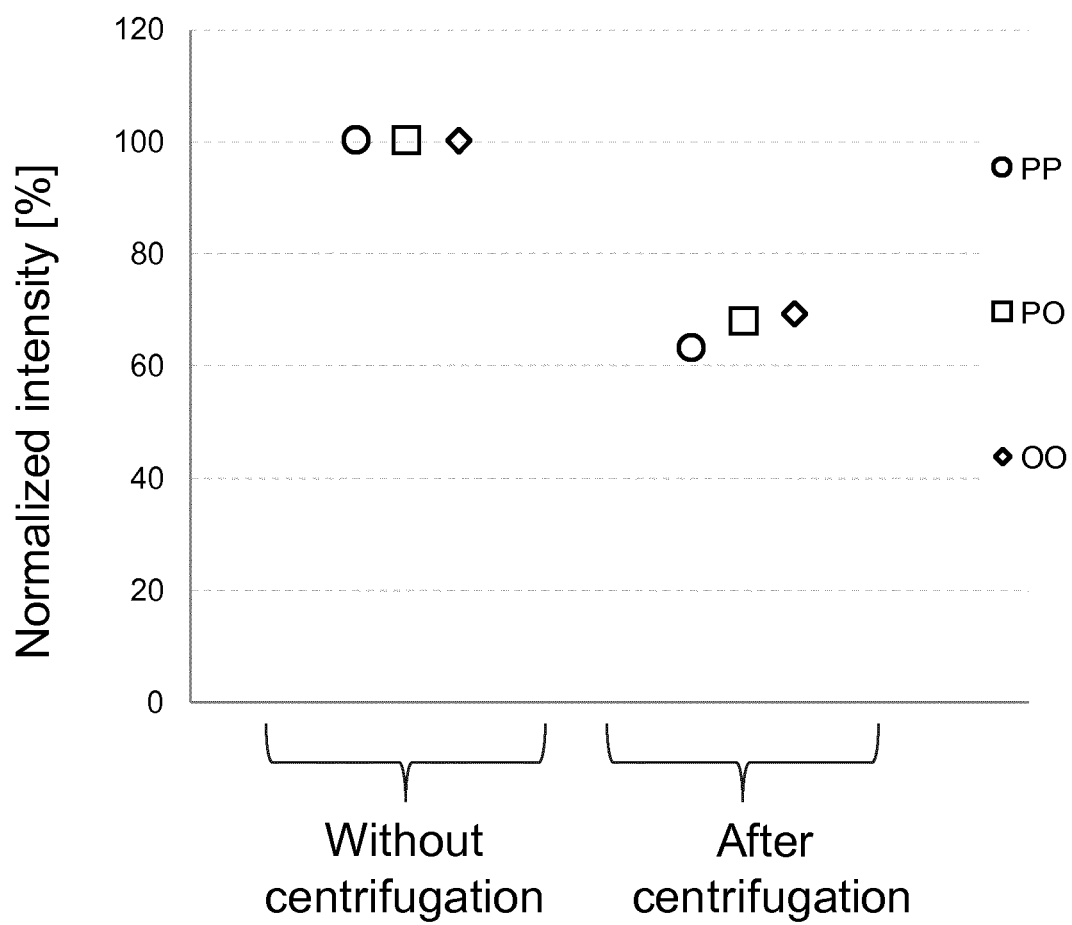

FIG. 11—MCPDEs observed in the heated "industrially produced crude palm oil" before and after removing the organochlorines with centrifugation.

Figure 12:
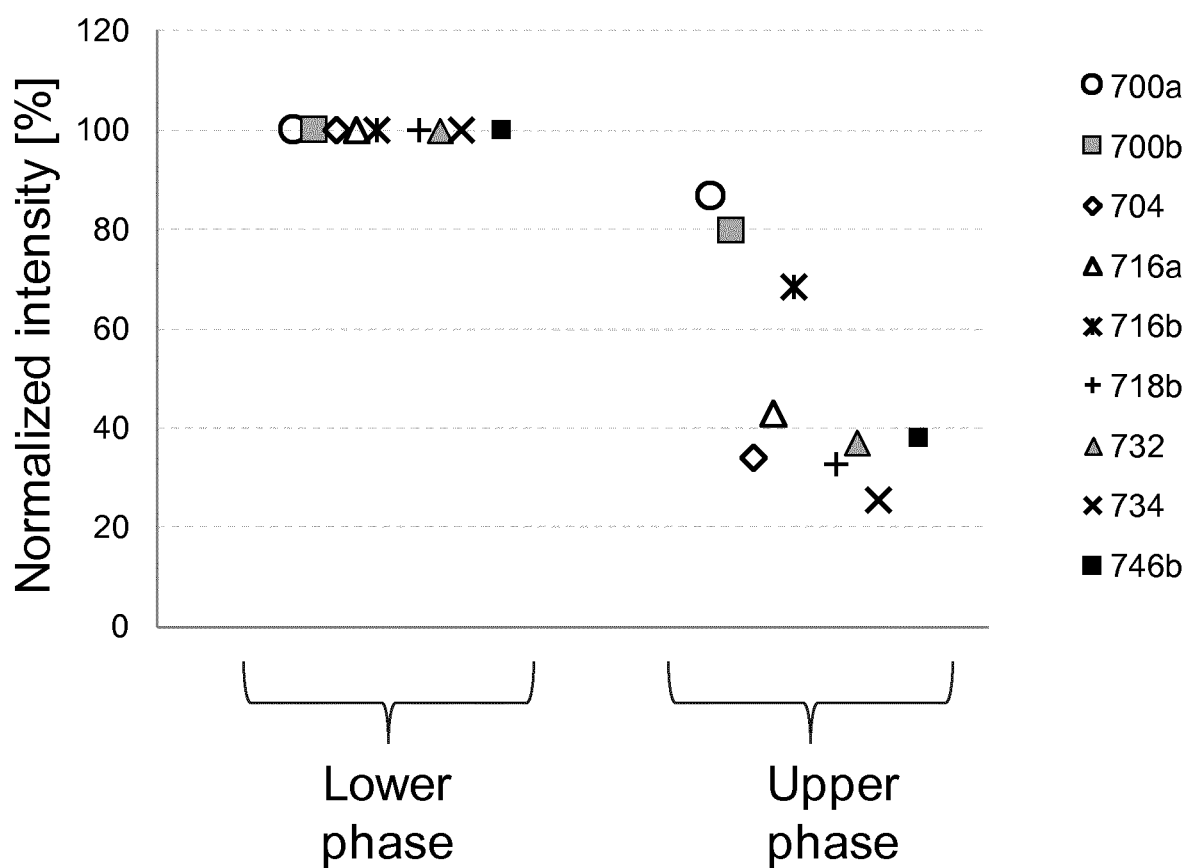

FIG. 12—Removal of chlorinated precursors with long term settling from "industrially produced crude corn oil". As a result of long term settling, precursors are removed from the upper phase of the oil and enriched in the lower phase of the oil.

Figure 13:
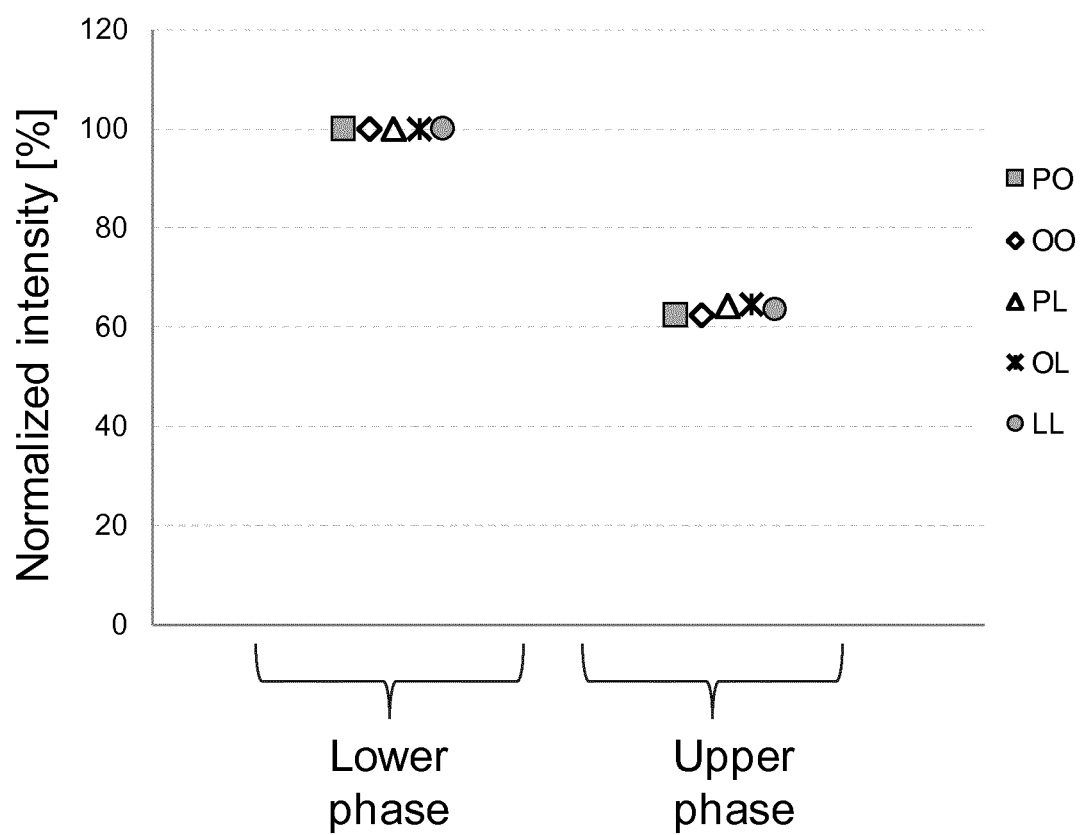

FIG. 13—MCPDEs observed in the heated lower and upper phase of the "industrially produced crude corn oil" following the long term settling. In accordance with the migration of the precursors from the upper phase to the lower phase as shown in FIG. 12, the upper phase develops less MCPDEs upon heat treatment than the lower phase.

Figure 14:
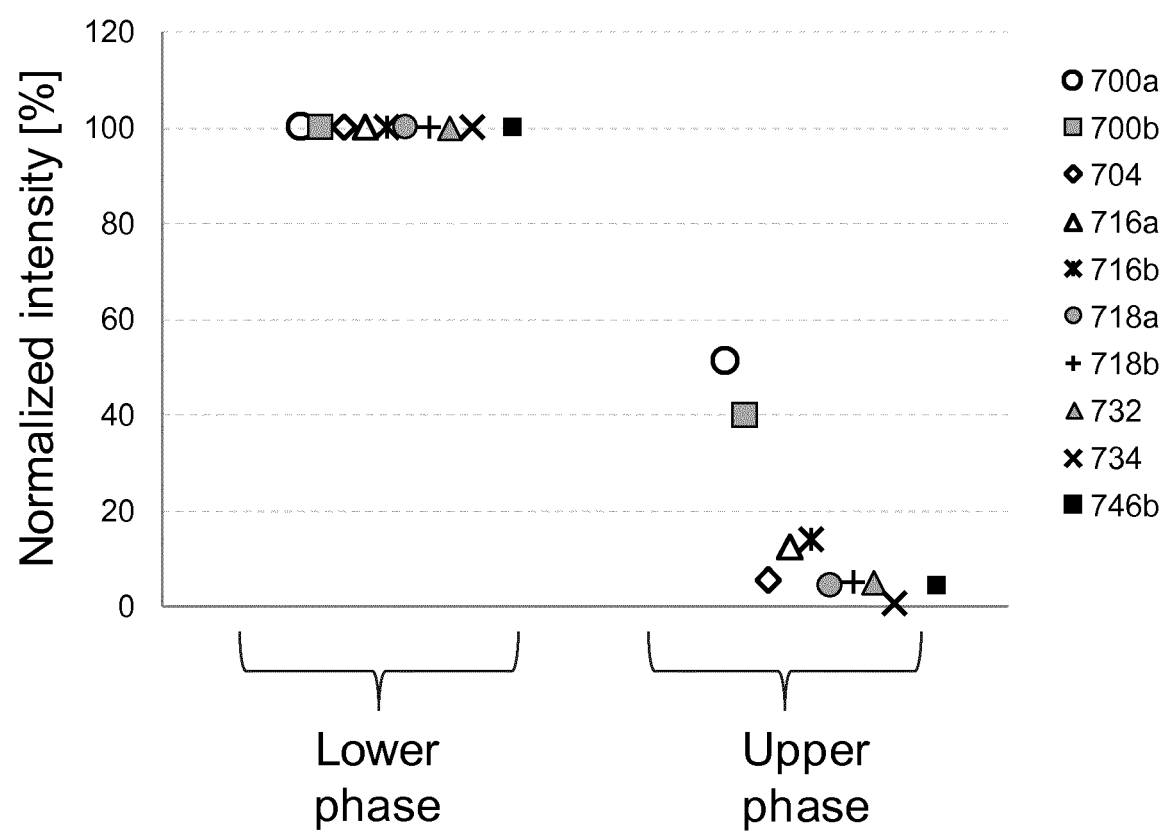

FIG. 14—Removal of chlorinated precursors with long term settling from "industrially produced crude sunflower oil". As a result of long term settling, precursors are removed from the upper phase of the oil and enriched in the lower phase of the oil.

Figure 15:
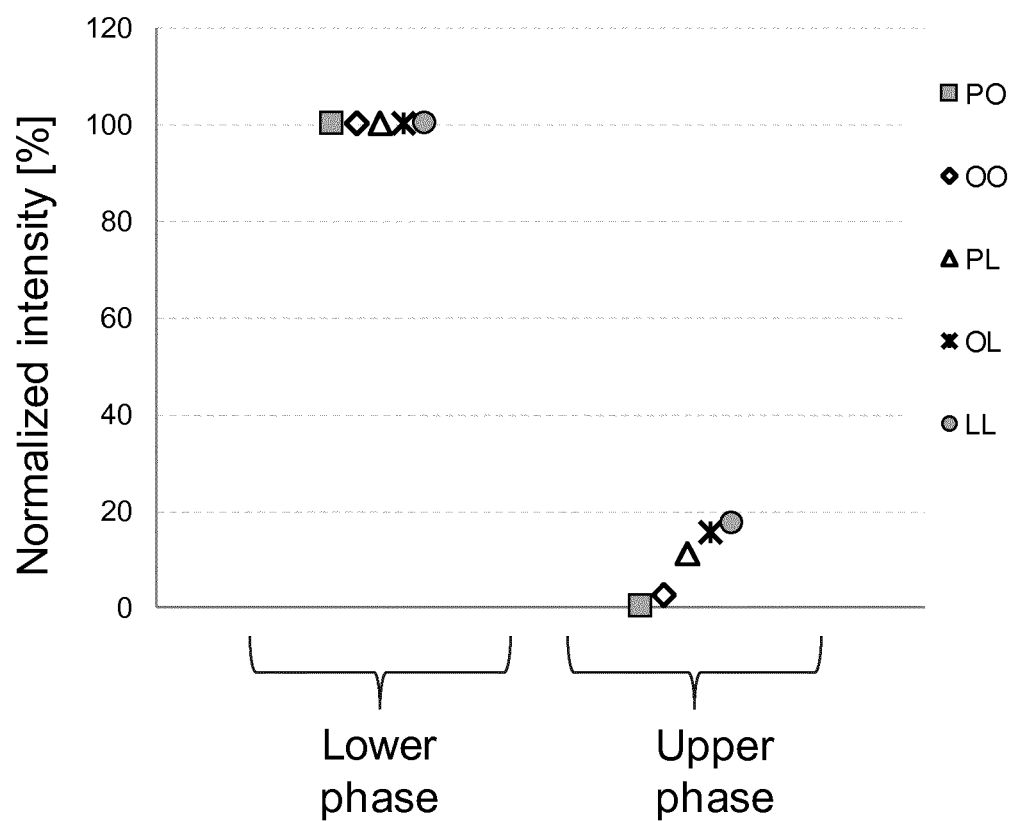

FIG. 15—MCPDEs observed in the heated lower and upper phase of the "industrially produced crude sunflower oil" following the long term settling. In accordance with the migration of the precursors from the upper phase to the lower phase as shown in FIG. 14, the upper phase develops less MCPDEs upon heat treatment than the lower phase.

Figure 16:
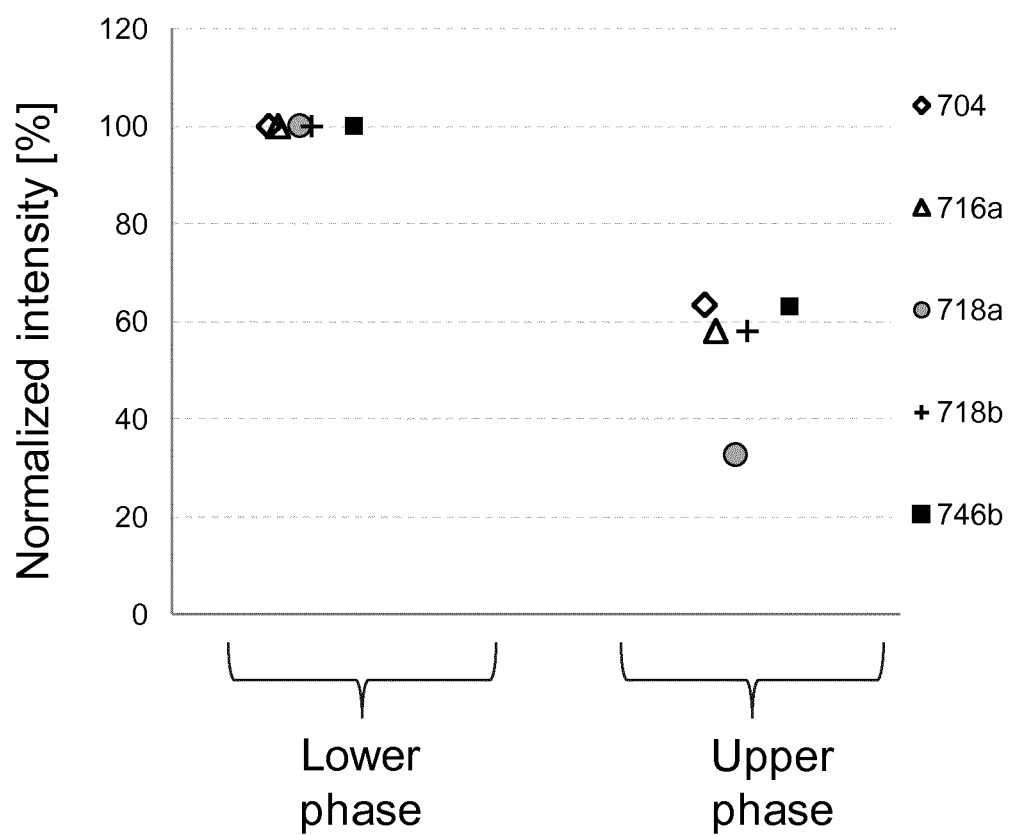

FIG. 16—Removal of chlorinated precursors with short term settling from "cold-pressed crude canola oil". As a result of short term settling, precursors are removed from the upper phase of the oil and enriched in the lower phase of the oil.

Figure 17:
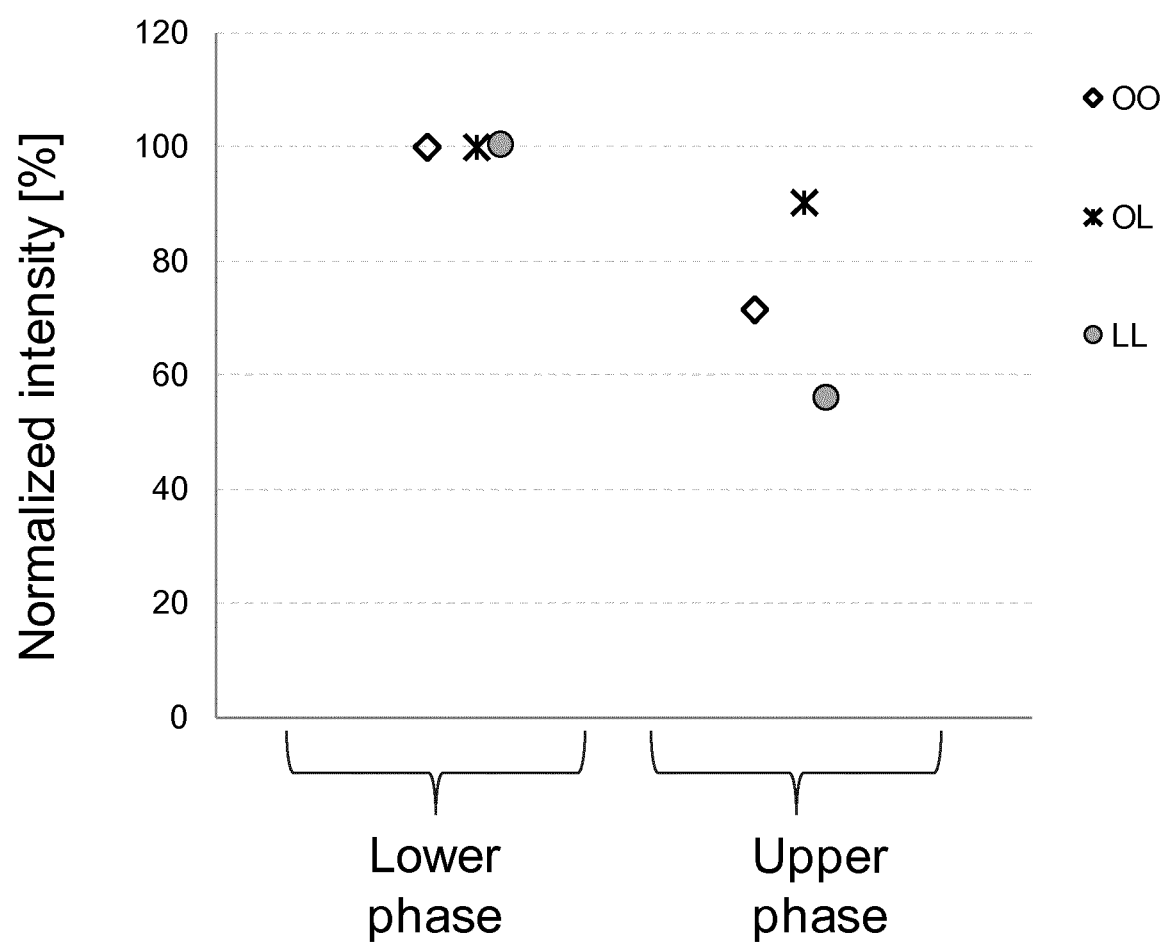

FIG. 17—MCPDEs observed in the heated lower and upper phase of the "cold-pressed crude canola oil" following the short term settling. In accordance with the migration of the precursors from the upper phase to the lower phase as shown in FIG. 14, the upper phase develops less MCPDEs upon heat treatment than the lower phase.

Figure 18:
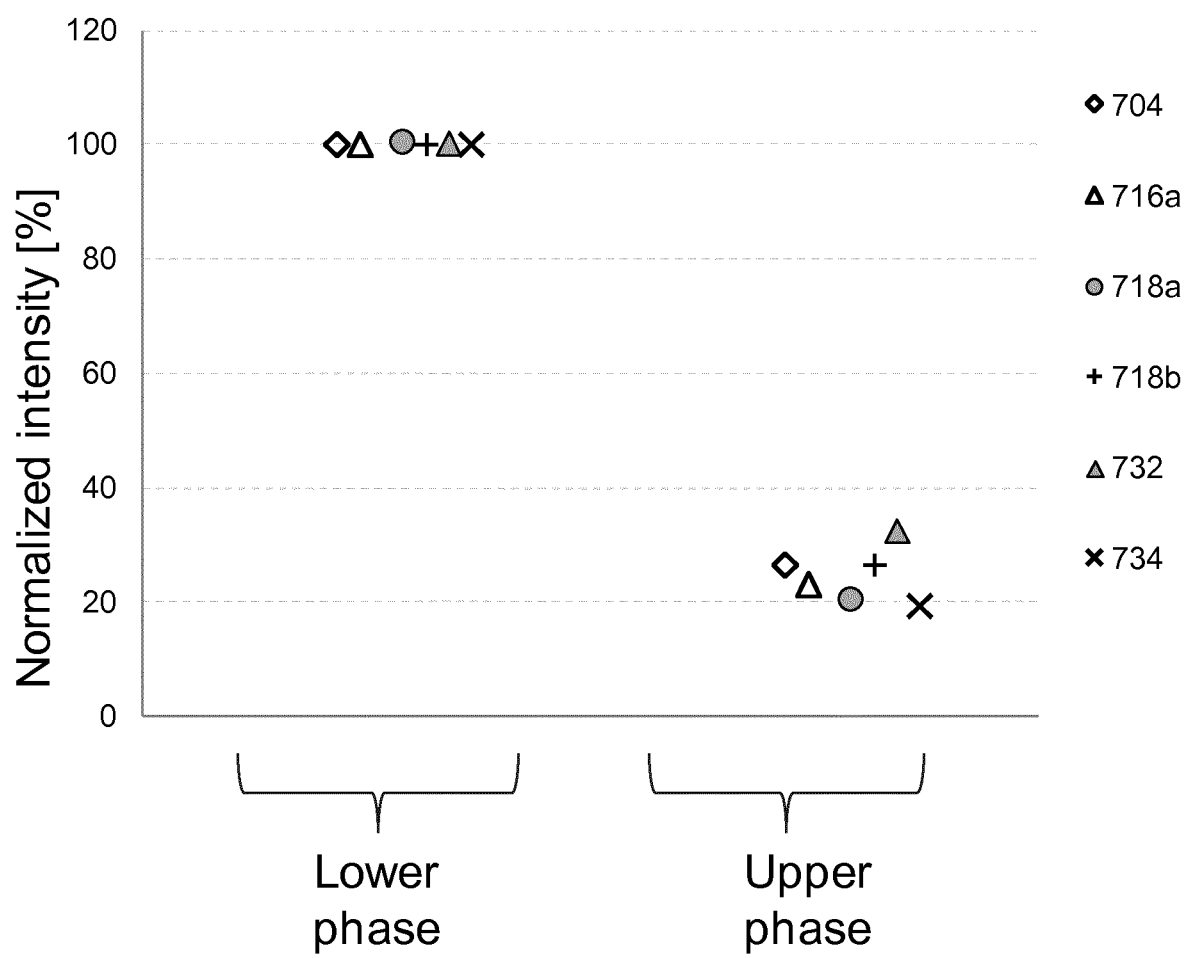

FIG. 18—Removal of chlorinated precursors with long term settling from "industrially produced crude soybean oil". As a result of long term settling, precursors are removed from the upper phase of the oil and enriched in the lower phase of the oil.

Figure 19:
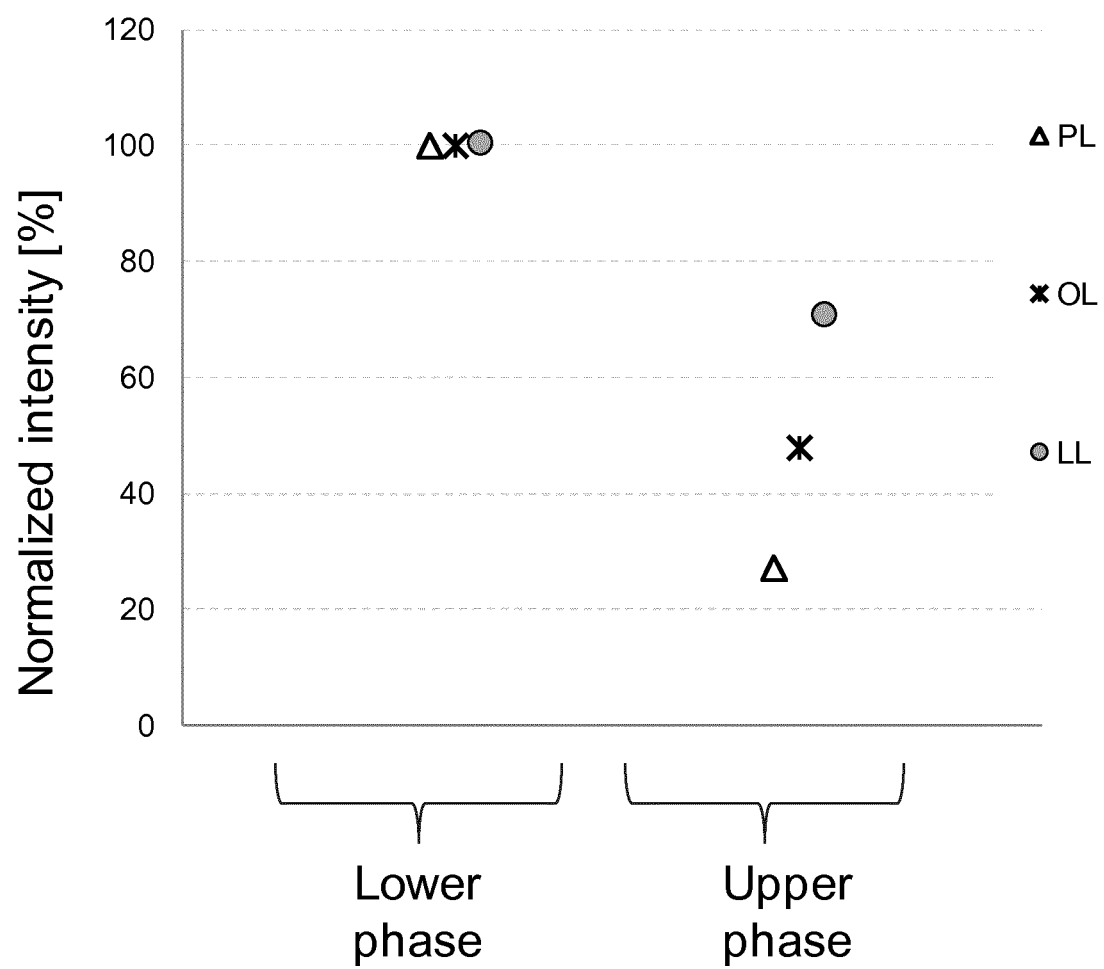

FIG. 19—MCPDEs observed in the heated lower and upper phase of the "industrially produced crude soybean oil" following the long term settling. In accordance with the migration of the precursors from the upper phase to the lower phase as shown in FIG. 18, the upper phase develops less MCPDEs upon heat treatment than the lower phase.

Figure 20:
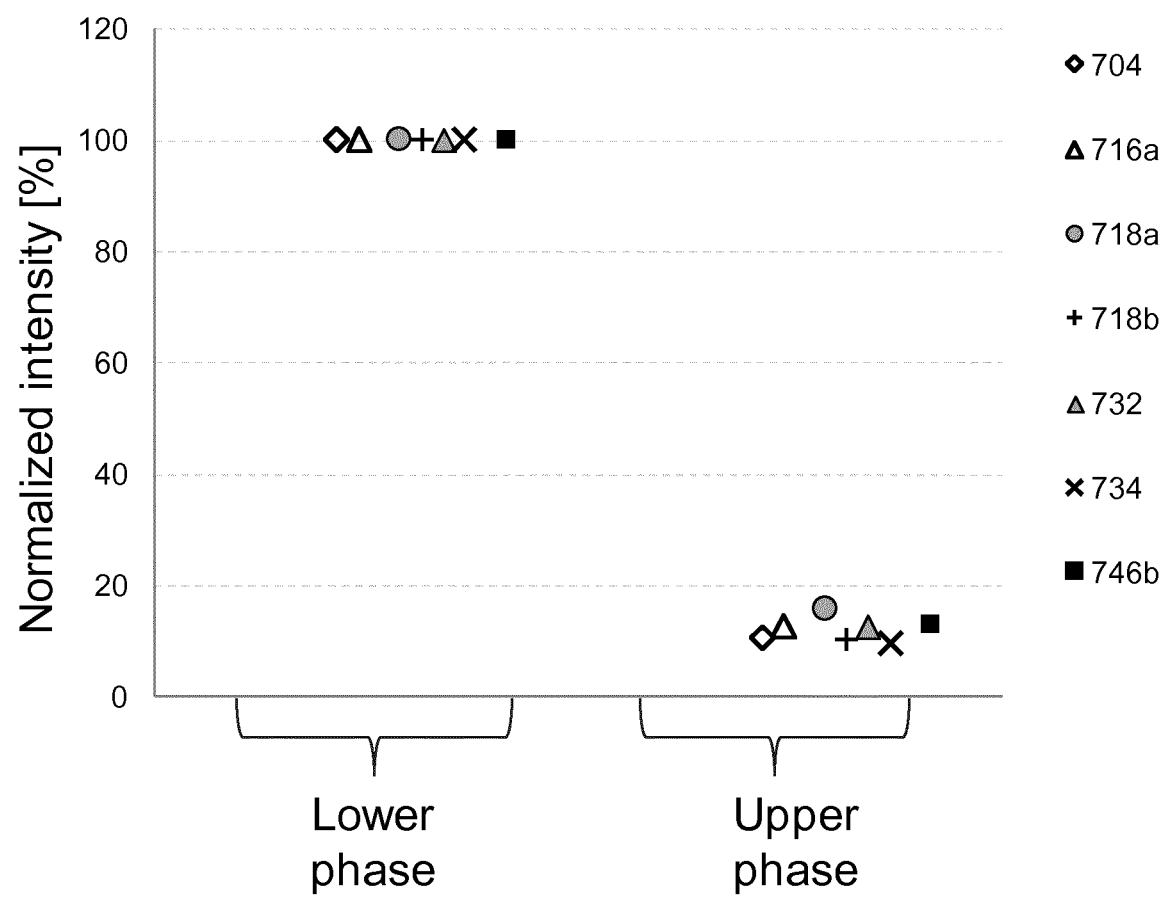

FIG. 20—Removal of chlorinated precursors with long term settling from "solvent extracted crude sunflower oil". As a result of long term settling, precursors are removed from the upper phase of the oil and enriched in the lower phase of the oil.

Figure 21:
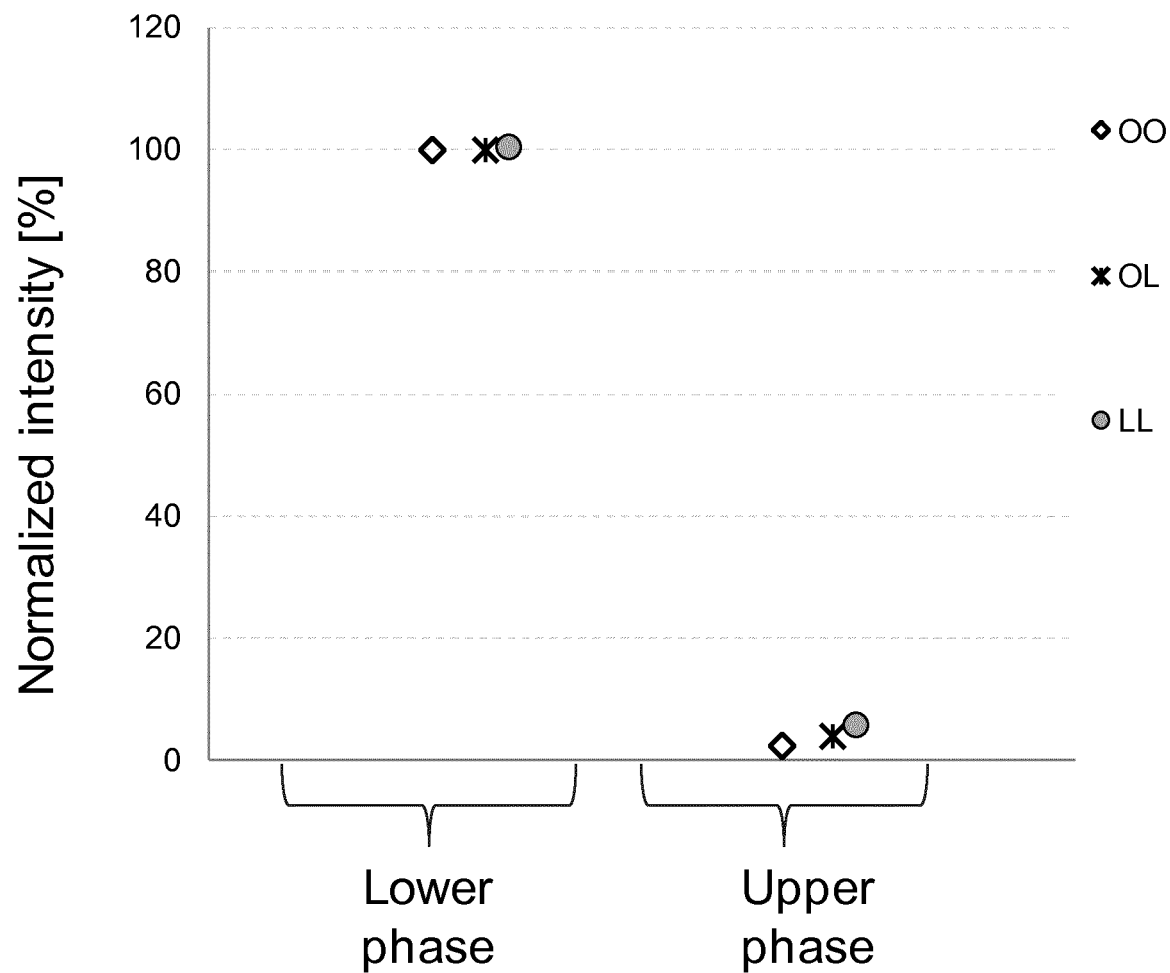

FIG. 21—MCPDEs observed in the heated lower and upper phase of the "solvent extracted crude sunflower oil" following the long term settling. In accordance with the migration of the precursors from the upper phase to the lower phase as shown in FIG. 20, the upper phase develops less MCPDEs upon heat treatment than the lower phase.

DETAILED DESCRIPTION OF THE INVENTION

The terms "comprising", "comprises" and "comprised of" as used herein are synonymous with "including" or "includes"; are inclusive or open-ended and do not exclude additional, non-recited members, elements or steps. The terms "comprising", "comprises" and "comprised of" also include the terms "consisting of", "containing" or "contains".

Purification

The purification is particularly suitable for removing contaminants such as chlorinated precursors, particularly organic chlorinated precursors, of monochloropropandiol esters (MCPDEs) and/or MCPDEs themselves (e.g. chlorinated precursors of 3-monochloropropan-1,2-diol esters (3-MCPDEs) and/or 3-MCPDEs themselves) from a starting triacylglyceride oil (i.e. a triacylglyceride oil immediately before it is subjected to step (a) of the method of the invention).

The method of the invention subjects the starting triacylglyceride oils to treatment that physically removes polar chlorinated substances, which may for example be an active source of chlorine during oil refining, from the starting (e.g. crude) oils. The treatment may be based on centrifugation or settling in order to allow centrifugational or gravitational force to concentrate the microparticles, segregated droplets and sediments in a narrow space of the storage vessel and subsequently allow the taking off of the upper phase pure oil.

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47). However, it has also been discovered that refined edible oils may contain 3-MCPD in its fatty acid ester form, while only containing very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It is well known that dehalogenation reactions can occur during thermal processes. For example, chlorine has been shown to leave chemical components as hydrogen chloride (gas) upon the input of sufficient activation energy, which is abundant during the deodorisation of vegetable oils at high temperatures (e.g. up to 270° C.). The inventors believe that hydrogen chloride may be evolved during oil refining from chlorine-containing compounds inherently present in the starting materials of the triacylglyceride oil refining process, for example plant materials.

Indeed, it has been suggested that MCPD generation reactions increase exponentially (>150° C.) and go to completion in a short time period.

Without wishing to be bound by theory, it is suggested that mechanistically, the MCPD di-esters may be formed during oil refinement via the protonation of the terminal ester group of triacylglycerides (TAG), which represent about 88-95% of total glycerides in most vegetable oils, through interaction with hydrogen chloride evolved during oil refining. The formed oxonium cation can then undergo intramolecular rearrangement, followed by nucleophilic substitution of chloride ion and the release of a free fatty acid and an MCPD di-ester.

Once removed through use of the method of the invention, the potential chlorine donors are no longer available for the generation of chlorinated compounds, such as MCPD esters during the heating steps in oil refinement. Product oils low in chlorinated substances are thereby obtained and the purified oils may be subjected to various refining practices, such as heat treatment and deodorisation, in order to produce refined oils low in or free from MCPDEs.

Thus, in one embodiment the quantity of chlorinated precursors, particularly organic chlorinated precursors, of monochloropropandiol esters (MCPDEs) is reduced in the purified triacylglyceride oil compared to the starting triacylglyceride oil.

In another embodiment, the quantity of chlorinated precursors of monochloropropandiol esters (MCPDEs) is reduced in the purified triacylglyceride oil by at least 40%, 50%, 60%, 70%, 80%, 90%, 95%, 96%, 97%, 98% or 99% compared to the starting triacylglyceride oil.

Refined oils produced using the method of the invention may contain, for example, less than 1 ppm, less than 0.5 ppm, or preferably less than 0.3 ppm MCPDEs.

Quantities of MCPDEs and their chlorinated precursors may be readily analysed using protocols well known in the art. For example, liquid chromatography/mass spectrometry (LC/MS)-based approaches are suitable for analysing levels of MCPDEs and their chlorinated precursors, as shown in the present Examples. Example chlorinated precursors of MCPDEs include the known chlorinated precursors with m/z 702.61807; 716.59723; 718. 61357; 734.60809; 776.581271 and 804.57813 (Food Additives and Contaminants in Vol. 28, No. 11, November 2011, 1492-1500).

In one embodiment, the triacylglyceride oil input into step (a) or step (c) of the method of the invention is crude triacylglyceride oil.

The term "crude oil" as used herein may refer to an unrefined oil. For example, in some embodiments, the triacylglyceride oil input into step (a) or step (c) of the method of the invention has not been refined, degummed, bleached and/or fractionated. In a preferred embodiment, the triacylglyceride oil has not been deodorised before step (a) or step (c).

In some embodiments, the triacylglyceride oil is subjected to preliminary processing before step (a) or step (c), such as preliminary cleaning. However, any processes carried out on the triacylglyceride oil before step (a) or step (c) preferably do not involve heating the triacylglyceride oil to a temperature greater than 100° C., 150° C., 200° C. or 250° C. In some embodiments, the triacylglyceride oil is subjected to preliminary refining, fractionation, hydrogenation and/or interesterification before step (a) or step (c).

Triacylglyceride Oil

The term "triacylglyceride" can be used synonymously with "triglyceride". In these compounds, the three hydroxyl groups of glycerol are each esterified by a fatty acid. Oils that may be purified using the method of the invention comprise triacylglycerides and include plant oil, animal oil, fish oil, algal oil and combinations thereof.

In a preferred embodiment, the triacylglyceride oil is a plant oil. In a preferred embodiment, the plant oil is at least partially solvent extracted. Preferably, the solvent is a mixture of 2-propanol and n-hexane.

Example, plant oils include sunflower oil, corn oil, canola oil, soybean oil, coconut oil, palm oil, palm kernel oil and cocoa butter.

In one embodiment, the plant oil is sunflower oil. In a preferred embodiment, the plant oil is palm oil.

In one embodiment, the plant oil is solvent extracted crude canola seed oil. In one embodiment, the plant oil is industrially produced crude palm oil. In one embodiment, the plant oil is industrially produced crude corn oil. In one embodiment, the plant oil is industrially produced crude sunflower oil. In one embodiment, the plant oil is cold pressed crude canola oil. In one embodiment, the plant oil is industrially produced crude soybean oil.

Crude Triacylglyceride Oil

In the case of palm oil, crude oil may be produced from different portions of palm fruit, e.g. from the flesh of the fruit known as mesocarp and also from seed or kernel of the fruit. The extraction of crude palm oil (CPO) from the crushed fruits can be carried out under temperatures ranging for example from 90 to 140° C.

In other cases, for example sunflower, crude oil may be produced by pressing, by solvent extraction or the combination thereof, for example as described by Gotor & Rhazi in Oilseeds & fats Crops and lipids 2016 (DOI: 10.1051/ocl/2016007).

Melting Temperature

The term "melting temperature" as used herein may refer to the temperature at which a solid changes state from solid to liquid at a pressure of 100 kPa. For example, the melting temperature may be the temperature at which a solid changes state from solid to liquid at a pressure of 100 kPa when heated at 2° C. per minute.

The skilled person is readily able to select suitable methods for the determination of the melting temperature of the triacylglyceride oil.

5 For example, apparatus for the analysis of melting temperatures may consist of a heating block or an oil bath with a transparent window (e.g. a Thiele tube) and a magnifier. A sample of the solid may be placed in a thin glass tube and placed in the heating block or immersed in the oil bath, which is then gradually heated. The melting of the solid can be observed and the associated melting temperature noted.

Centrifugation

The term "centrifugation" as used herein may refer to the rapid rotation of the oil vessel, for example as it is warmed to a temperature at which the oil is in the liquid state. This temperature can be 30° C., 40° C., 50° C., 60° C., 70° C., 80° C., 100° C. or above for palm oil and 50° C., 60° C., 80° C., 100° C. or above for palm stearin, 15° C., 20° C. or above for palm olein, 5° C. or above for seed oils including sunflower oil, canola/rapeseed oil, corn oil.

In a preferred embodiment, the temperature can be between 40° C. and 80° C. for palm oil, between 50° C. and 70° C. In a preferred embodiment, the temperature can be between 5° C. and 20° C. for sunflower oil. In a preferred embodiment, the centrifugation speed is at least 15,000 g for 15 min.

Settling

The term "settle" or "settling" as used herein may refer to a movement-free period that includes setting the oil vessel into a fixed, movement free environment and avoid its disturbance for a period of time that can be at least 4 hours, 6 hours, 1 d, 2 d, a week or even a month.

In one embodiment, the oil vessel can be settled into a fixed, movement free environment and its disturbance avoided for a period of time of at least 5 months, for example for crude sunflower oil or crude soybean oil. In one embodiment, the crude oil is heated to at least 60° C. prior to settling.

In one embodiment, the oil vessel can be settled into a fixed, movement free environment and its disturbance avoided for a period of time of at least 4 days, for example for cold pressed crude canola oil.

Further Refinement

As the chlorinated precursors, particularly the organic chlorinated precursors, are depleted by the method of the invention, heating during any subsequent refinement processes will not cause significant generation of unwanted chlorinated compounds, such as the MCPDEs.

In one embodiment, the method further comprises one or more processes selected from the group consisting of physical or chemical refining, degumming, neutralization and bleaching subsequent to step (c).

In one embodiment, the method further comprises deodorisation subsequent to step (f), preferably wherein the deodorisation is vacuum steam deodorisation.

In one embodiment, the method further comprises fractionation subsequent to step (f).

Processes for carrying out refinement, degumming, bleaching, deodorisation and fractionation are well known in the art.

By way of example, refinement of plant oil, such as vegetable oil, typically consists of physical refining or chemical refining.

In efforts aimed at increased sustainability, oil refineries have modified their plant oil processing lines in the past few decades for the minimisation of energy expenditure (economisers) and the reduction of waste. However, the steps of these two refining processes have essentially remained the same.

Physical refining is essentially an abridged form of chemical refining and was introduced as the preferred method of palm oil refining in 1973. It may be a three step continuous operation where the incoming oil is pre-treated with acid (degumming), cleansed by being passed through adsorptive bleaching clay, and then subjected to steam distillation. This process allows for the subsequent deacidification, deodorisation and decomposition of carotenoids unique to palm oil (i.e. the crude oil is deep red in colour, unlike other vegetable oils). Given the lack of neutralisation step in physical refining, refined bleached (RB) oil produced from a physical refinery contains nearly the same free fatty acid (FFA) levels as found in the crude oil.

Neutralised bleached (NB) oil from a chemical refinery and RB palm oil are comparable pre-deodorisation in every other aspect.

The heat bleaching unit operation is the main source of loss in the oil refining process resulting in 20-40% reduction in oil volume post filtration. The process typically lasts for about 30-45 min and typically takes place under 27-33 mbar vacuum at a temperature of 95-110° C.

Heat bleached oil may then be rerouted in piping to a deaerator that aides in the removal of dissolved gases, as well as moisture, before being sent to a deodorisation tower.

A bleaching step may comprise heating the oil and cleaning the oil by passing it through adsorptive bleaching clay.

A deodorisation step may comprise steam distillation.

The skilled person will understand that they can combine all features of the invention disclosed herein without departing from the scope of the invention as disclosed.

Preferred features and embodiments of the invention will now be described by way of non-limiting examples.

The practice of the present invention will employ, unless otherwise indicated, conventional techniques of chemistry, biochemistry, molecular biology, microbiology and immunology, which are within the capabilities of a person of ordinary skill in the art. Such techniques are explained in the literature. See, for example, Sambrook, J., Fritsch, E. F. and Maniatis, T. (1989) Molecular Cloning: A Laboratory Manual, 2nd Edition, Cold Spring Harbor Laboratory Press; Ausubel, F. M. et al. (1995 and periodic supplements) Current Protocols in Molecular Biology, Ch. 9, 13 and 16, John Wiley & Sons; Roe, B., Crabtree, J. and Kahn, A. (1996) DNA Isolation and Sequencing: Essential Techniques, John Wiley & Sons; Polak, J. M. and McGee, J. O'D. (1990) In Situ Hybridization: Principles and Practice, Oxford University Press; Gait, M. J. (1984) Oligonucleotide Synthesis: A Practical Approach, IRL Press; and Lilley, D. M. and Dahlberg, J. E. (1992) Methods in Enzymology: DNA Structures Part A: Synthesis and Physical Analysis of DNA, Academic Press. Each of these general texts is herein incorporated by reference.

EXAMPLES

Example 1

Materials and Methods

Production of Solvent Extracted Crude Palm Oil 1.8 kg frozen, whole, intact palm fruit was thawed at room temperature. The kernels were removed from the fruit manually using a scalpel. 4 l of extraction solution was prepared by mixing 2 l of 2-propanol and 2 l of n-hexane. 1.4 kg of palm pulp including the fruit flesh and skin was mixed, pureed and homogenised with 2 l of extraction solution using a commercial immersion blender mixer (Bamix Gastro 200). The resulting slurry was mixed and further homogenised with the remaining 2 l of extraction solution using a polytron (Kinematica Polytron PT 10 35 GT). The resulting slurry solution was aliquoted into 1 l polypropylene tubes (Sorvall 1000 ml) and centrifuged at 4000 g for 15 min at 30° C. in a Thermo Scientific Heraeus Cryofuge 8500i centrifuge. The organic phases were filtered through filter paper (Whatman 595 ½) and were combined. The organic solvent was then evaporated from the oil using a B0chi Rotavapor R-300 system at 60° C. (B-300 heating bath, 1-300 vacuum controller, V-300 pump and P-314 recirculating chiller operated at 4° C.). The vacuum was stepwise adjusted until it reached 10 mbar to avoid boiling of the sample.

Production of Solvent Extracted Crude Sunflower Seed Oil 1.2 kg of sunflower seeds were crushed and homogenised with 1.5 l of extraction solution (2-propanol:n-hexane, 1:1 v/v) using a commercial immersion blender mixer (Bamix Gastro 200). The homogenate was mixed with a further 1.5 l of extraction solution and further homogenised using a polytron (Kinematica Polytron PT 10 35 GT). The resulting slurry was aliquoted into 1 l polypropylene tubes (Sorvall 1000 ml) and centrifuged at 4000 g for 15 min at 22° C. in a Thermo Scientific Heraeus Cryofuge 8500i centrifuge. The organic phases were filtered through filter paper (Whatman 595 ½) and were combined. The organic solvent was then evaporated from the oil using a B0chi Rotavapor R-300 system at 60° C. (B-300 heating bath, 1-300 vacuum controller, V-300 pump and P-314 recirculating chiller operated at 4° C.). The vacuum was stepwise adjusted until it reached 10 mbar to avoid boiling of the sample.

Mitigation Trials

Centrifugation of Solvent Extracted Crude Palm Oil

1 L of crude palm oil prepared as described above was melted by heating to 80° C. in a water bath. The oil was homogenized by manual shaking. 40 ml aliquots were transferred into 50 ml Falcon test tubes. The tubes were inserted into an Eppendorf 5810 centrifuge pre-heated to 40° C. and were centrifuged at 15000 g for 15 min at 40° C.

Centrifugation of Solvent Extracted Crude Sunflower Oil

1 L of crude sunflower oil prepared as described above was homogenized by manual shaking. 40 ml aliquots were transferred into 50 ml Falcon test tubes. The tubes were inserted into an Eppendorf 5810 centrifuge and were centrifuged at 15000 g for 15 min at 23° C.

In-Ampoule Heat Treatment of Samples

The heat treatment of crude oil samples was performed in sealed glass ampoules under nitrogen for 2 h at 230° C. in a Thermo Scientific Heraeus oven (serie 6100). The glass ampoules were fabricated from glass Pasteur pipettes by flushing them with nitrogen and sealing them using a Bunsen gas burner. These conditions were chosen in order to mimic the thermal conditions used during edible-oil deodorisation.

Liquid Chromatography-Mass Spectrometry Analysis

Sample Preparation

Oils and home-produced crude oils were diluted stepwise prior to injection. Firstly, 50 µl of each sample was transferred into a vial and 950 µl of a mixture of n-Hexane:Acetone (1:1 v/v) was added. The sample was vortexed for 5-10 s. In the second step, this solution was further diluted by mixing a 100 µl aliquot and with 900 µl of acetone. The obtained solution was vortexed for 5-10 s. The final dilution step consisted of mixing the following:
- 10 µl solution obtained after the second dilution step;
- 5 µl of a 0.2 ng/µl internal standard solution (1-oleoyl 2-linoleoyl 3-chioropropanediol-$^2$H5); and
- 85 µl of a mixture of Acetone:Methanol (1:1 v/v)

LC Conditions

Ultra high performance liquid chromatography was performed using a ThermoFisher Accela system equipped with a silica based octadecyl phase (Waters Acquity HSS C18, 1.7 µm; 2.1×150 mm). The applied solvent gradient is summarised in Table 1.

TABLE 1

Details of the applied LC gradient (solvent A was 1 mM ammonium-formate in methanol; and solvent B was 100 µM ammonium-formate in isopropanol).

| Time [min] | Solvent A [%] | Solvent B [%] | Flow rate [µL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters and their organic precursors was performed using a Thermo Fisher Lumos Orbitrap mass spectrometer. This platform enabled analysis up to 240,000 Full Width at Half Maximum mass resolution and a routine mass accuracy of 2 ppm. The precursors of MCPD esters were detected in negative ion mode electrospray ionisation (ESi$^-$), while MCPD esters were monitored in ESI positive ion mode (ESi$^+$). Under these conditions the observed MCPD precursor ion was [M−H]$^-$, whereas the monitored MCPD ester ions were the [M+NH$_4$]$^+$ and [M+Na]$^+$ adducts. For data interpretation the m/z signals were extracted in a 10 ppm window.

Results & Discussion

Solvent Extracted Crude Palm Oil

The centrifugation-assisted removal of chlorinated precursors was applied to different batches of crude palm oil, as described above. The signals of known chlorinated precursors at m/z 702.61807; 718.61357 and 734.60809 (Food Additives and Contaminants in Vol. 28, No. 11, November 2011, 1492-1500) were monitored as described above. Furthermore, additional signals of so far not reported chlorinated organic substances were monitored at m/z 642,52273; 704,59575; 732,62744; 746,64325; 789,52906.

Figure 1:
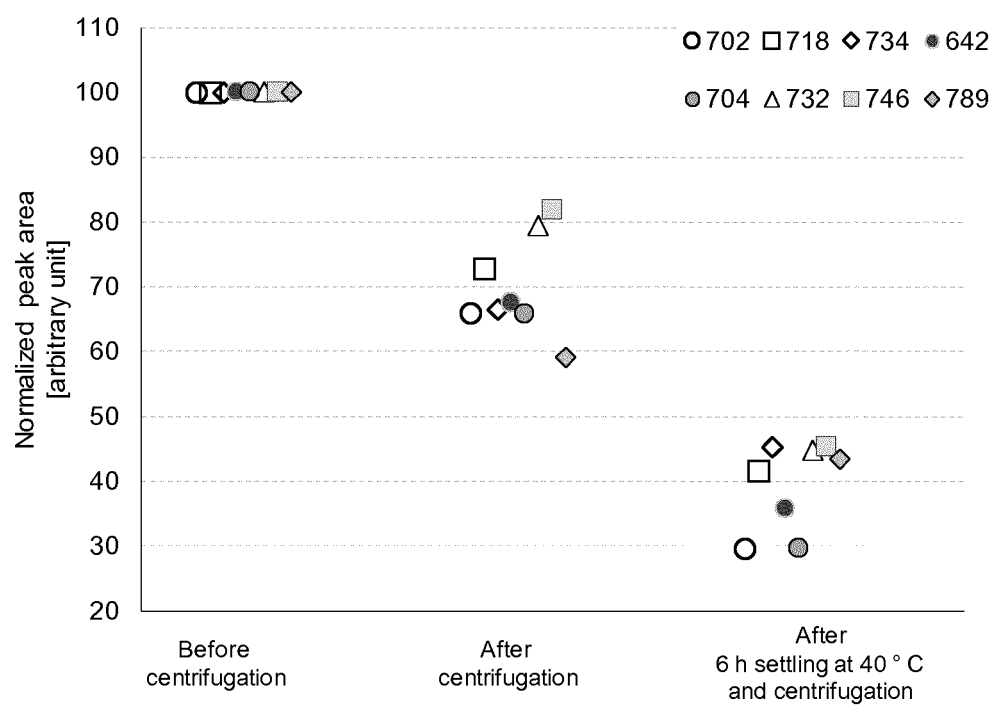
FIG. 1

To facilitate the visual overview of results, the signals were normalized to the peak areas found in the starting material as 100%. The obtained peak areas from the crude oil before centrifugation (starting material), after centrifugation and after 6 h settling+centrifugation are shown FIG. 1.

These results suggest that both settling and centrifugation can reduce the concentration of chlorinated substances in the oil.

The benefit of this invention includes but is not limited to removing chlorinated substances with mass between 300-1000 Dalton and in any polarity range that is more polar than the triacylglycerols e.g. tripalmitin with retention time of 24.5 min. This is illustrated in Table 2 reporting the m/z values and corresponding chromatographic retention times reflecting the polarity of the investigated substances.

TABLE 2

| Monitored ion [m/z] | Retention time [min] |
|---|---|
| 323.96960 | 0.7 |
| 642.52273 | 4.3 |
| 672.57038 | 7.5 |
| 686.41978 | 1.6 |
| 704.59575 | 6.5 |
| 716.59607 | 8.0 |

TABLE 2-continued

| Monitored ion [m/z] | Retention time [min] |
|---|---|
| 718.61161 | 6.6 |
| 718.61184 | 7.5 |
| 732.62744 | 8.7 |
| 746.64296 | 8.8 |
| 746.64325 | 10.1 |
| 789.52906 | 3.4 |
| 805.46566 | 10.4 |
| 850.64170 | 18.1 |
| 859.62264 | 12.4 |
| 899.34996 | 4.9 |

Following mitigation via centrifugation, the resulting oil and the starting material (without centrifugation) have been subjected to heat treatment as described above in order to mimic the thermal conditions used during edible-oil deodorisation. The resulting samples have been analysed for their MPCDE content by LC-MS. The beneficial effect of the centrifugation based mitigation is shown in FIG. 2 (dipalmitoyl-MCPD, PP-MCPD), FIG. 3 (palmitoyl-oleyl-MCPD, PO-MCPD), FIG. 4 (dioleyl-MCPD, OO-MCPD) and FIG. 5 (oleyl-linoleyl-MCPD, OL-MCPD).

Solvent Extracted Crude Sunflower Oil

The centrifugation-assisted removal of chlorinated precursors was applied to crude solvent extracted sunflower oil, produced as described above. Following mitigation via centrifugation, the resulting oil and the starting material (without centrifugation) have been subjected to heat treatment in triplicates as described above in order to mimic the thermal conditions used during edible-oil deodorisation. The resulting samples have been analysed for their MPCDE content by LC-MS. The beneficial effect of the centrifugation based mitigation is shown in FIG. 6 (dioleyl-MCPD, OO-MCPD), FIG. 7 (oleyl-linoleyl-MCPD, OL-MCPD) and FIG. 8 (dilinoleyl-MCPD, LL-MCPD).

Overall, the data show substantial reduction in the levels of both chlorinated precursors and monochloropropandiol esters (MCPDEs) after the mitigation compared to the levels observed in the absence of treatment for each of the studies on crude sunflower oil and crude palm oil.

Example 2

The information provided in this example is relevant for Examples 3 to 9 which follow.

Sample Analysis

Sample Preparation

Oil samples were diluted stepwise prior to injection.
1) Firstly, 100 μL of each sample was transferred into a vial and 900 μL of a mixture of n-Hexane:Acetone (1:1 v/v) was added. The sample was vortexed for 5-10 s.
2) In the second step, 50 μL of this solution was further diluted by mixing it with 950 μL of acetone. The obtained solution was vortexed for 5-10 s.
3) 100 μL of this latter solution was mixed with 90 μL of methanol and 10 μL of internal standard mix solution. (the internal standard mix solution contained at 2 ng/μL concentration the following stable isotope labeled compounds solubilized in methanol: 1-oleoyl 2-linoleoyl 3-chloropropanediol-$^2$H5 (OL), 1-2-dipalmitooyl 3-chloropropanediol-$^2$H$_5$ (PP), 1-palmitoyl 2-oleoyl 3-chloropropanediol-$^2$H$_5$ (PO), 1-palmitoyl 2-linoleoyl 3-chloropropanediol-$^2$H$_5$ (PL), 1-2-dilinoleoyl 3-chloropropanediol-$^2$H$_5$ (LL)), 1-2-oleoyl 3-chloropropanediol-$^2$H5 (OO)).

LC Conditions

Ultra high performance liquid chromatography was performed using either a Thermo UltiMate 3000 system or a Waters Acquity H-class system equipped with a silica based octadecyl phase (Waters Acquity HSS C18, 1.7 μm; 2.1×150 mm). The applied solvent gradient is summarized in Table 3.

TABLE 3

Details of the applied LC gradient (solvent A was 1 mM ammonium-formate in methanol; and solvent B was 100 μM ammonium-formate in isopropanol).

| Time [min] | Solvent A [%] | Solvent B [%] | Flow rate [μL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters and their organic precursors was performed using Thermo Fisher high resolution mass spectrometers (Q Exactive Hybrid Quadrupole-Orbitrap, Orbitrap Fusion™ Lumos™ Tribrid™ and Orbitrap Elite Hybrid). These platforms enabled highly selective mass analysis at a routine mass accuracy of ~2 ppm. The precursors of MCPD esters (MCPDE) were detected in negative ion mode electrospray ionisation (ESI$^-$), while MCPD esters were monitored in ESI positive ion mode (ESI$^+$). Under these conditions the observed MCPD precursor ion was [M−H]$^-$, whereas the monitored MCPD ester ions were the [M+NH$_4$]$^+$ and [M+Na]$^+$ adducts.

Data Interpretation

The relative quantification of precursors was performed by first extracting the ion chromatograms of the respective substances at their respective m/z value in a 10 ppm mass window and then integrating the resulting peak areas at the corresponding chromatographic retention time. The m/z and chromatographic retention time values of each precursor analyte are shown in Table 4.

For every experiment, the peak areas detected in the control samples were set as 100% and the results found in the mitigated samples were expressed as a relative % compared to the non-mitigated control samples.

TABLE 4

| Monitored ion [m/z] | Retention time [min] |
|---|---|
| 700.60161 (700a) | 10.0 |
| 700.60161 (700b) | 10.9 |
| 704.59575 (704) | 6.5 |
| 716.59607 (716a) | 6.2 |
| 716.59607 (716b) | 8.0 |
| 718.61161 (718a) | 6.6 |
| 718.61161 (718b) | 7.5 |
| 732.62744 (732) | 8.7 |
| 734.60709 (734) | 5.7 |
| 746.64296 (746a) | 8.8 |
| 746.64325 (746b) | 10.1 |

The relative quantification of MCPDE was performed by first extracting the ion chromatograms of the [M+NH4t and [M+Nat adducts at their respective m/z value in a 10 ppm mass window and then integrating the resulting peak areas at the corresponding chromatographic retention time. The abbreviations of the monitored MPCDEs are as following: PP: dipalmitoyl MCPD ester; PO: palmitoyl-oleyl MCPD ester; 00: dioleyl MCPD ester; OL: oleyl-linoleyl MPCD ester; LL: dilinoleyl MPCD ester; PL: palmitoyl-linoleyl MPCD ester.

For every experiment, the peak areas of the most abundant MPCDEs detected in the control samples were set as 100% and the results found in the mitigated samples were expressed as a relative % compared to the non-mitigated control samples.

Example 3

Solvent Extracted Crude Canola Seed Oil 7.9 kg of canola seeds were pressed using a home electrical oil press (OP 700, Rommelsbacher, Germany) resulting in ~2.4 kg of pressed oil and ~5.5 kg of remaining solid residue (cake).

200 g of this remaining solid residue/cake was homogenised with 800 ml of extraction solution (n-hexane:isopropanol, 1:1 (v/v)) using a polytron (Kinematica Polytron PT 10 35 GT). The organic phase was then filtered through filter paper (Whatman 595 ½). The organic solvent was then evaporated from the oil using a Buchi Rotavapor R-300 system at 60° C. (B-300 heating bath, 1-300 vacuum controller, V-300 pump and P-314 recirculating chiller operated at 4° C.). The vacuum was stepwise adjusted until it reached 10 mbar to avoid boiling of the sample. The resulting oil was again filtered at 65° C. through filter paper (Whatman 595 ½).

Mitigation was performed by applying centrifugation to the samples. 40 ml aliquots were transferred into 50 ml Falcon test tubes. The tubes were inserted into an Eppendorf 5810 centrifuge and were centrifuged at 15000 g for 15 min at 23° C. The resulting samples along with the non-centrifuged control samples were analysed by LC-MS as described above for their precursor content. The effect of centrifugation on the precursor levels is shown in FIG. 9.

Example 4

Industrially Produced Crude Palm Oil

Industrially produced crude palm oil was purchased from Nutriswiss (Lyss, Switzerland). The oil was subjected to mitigation trials by centrifugation.

1 L of crude palm oil was melted by heating to 80° C. in a water bath. The oil was homogenized by manual shaking. 40 mL aliquots were transferred into 50 mL Falcon test tubes. The tubes were inserted into an Eppendorf 5810 centrifuge pre-heated to 40° C. and were centrifuged at 15000 g for 15 min at 40° C.

The resulting samples along with the non-centrifuged control samples were analysed by LC-MS as described above for their precursor content. The effect of centrifugation on the precursor levels is shown in FIG. 10.

The same samples were also subjected to heat treatment in ampoules in order to simulate the formation of MCPDEs and were analysed by LC-MS for their MCPDE content accordingly. The benefits of the centrifugation on the resulting MCPDE levels are shown in FIG. 11.

Example 5

Long-Term Settling of Industrially Produced Crude Corn Oil

Industrially produced crude corn oil was purchased from VFI GmbH (Weis, Austria).

The crude oil was first heated in a 2-L pyrex bottle at 60° C. in the water bath and was homogenized by vigorous manual shaking, then was left on the bench at room temperature without any disturbance for 5 months.

After the 5-month time period, 40-mL aliquots were taken from the upper phase and from the bottom phase, called "upper phase" and "lower phase" respectively.

The resulting samples were analysed by LC-MS as described above for their precursor content. The effect of long term settling on the precursor levels is shown in FIG. 12.

The same samples were also subjected to heat treatment in ampoules in order to simulate the formation of MCPDEs and were analysed by LC-MS for their MCPDE content accordingly. The benefits of the long term settling on the resulting MCPDE levels are shown in FIG. 13.

Example 6

Long-Term Settling of Industrially Produced Crude Sunflower Oil

Industrially produced crude bio sunflower oil was purchased from VFI GmbH (Weis, Austria).

The crude oil was first heated in a 2-L pyrex bottle at 60° C. in the water bath and was homogenized by vigorous manual shaking, then was left on the bench at room temperature without any disturbance for 5 months.

After the 5-month time period, 40-mL aliquots were taken from the upper phase and from the bottom phase, called "upper phase" and "lower phase" respectively.

The resulting samples were analysed by LC-MS as described above for their precursor content. The effect of long term settling on the precursor levels is shown in FIG. 14.

The same samples were also subjected to heat treatment in ampoules in order to simulate the formation of MCPDEs and were analysed by LC-MS for their MCPDE content accordingly. The benefits of the long term settling on the resulting MCPDE levels are shown in FIG. 15.

Example 7

Short Term Settling of Cold Pressed Crude Canola Oil 7.9 kg of canola seeds were pressed using a home electrical oil press (OP 700, Rommelsbacher, Germany) resulting in ~2.4 kg of pressed oil and ~5.5 kg of remaining solid residue (cake). The pressed oil was then filtered through filter paper (Whatman 595 ½) at 65° C. in the oven.

2 L of crude oil was then left on the bench at room temperature without any disturbance for 4 days for settling.

After the 4-days time period, a 20-mL aliquot was taken from both the upper phase and from the bottom phase, called "upper phase" and "lower phase" respectively.

The resulting samples were analysed by LC-MS as described above for their precursor content. The effect of short term settling on the precursor levels is shown in FIG. 16.

The same samples were also subjected to heat treatment in ampoules in order to simulate the formation of MCPDEs and were analysed by LC-MS for their MCPDE content accordingly. The benefits of the short term settling on the resulting MCPDE levels are shown in FIG. 17.

Example 8

Long-Term Settling of Industrially Produced Crude Soybean Oil

Industrially produced crude bio soybean oil was purchased from VFI GmbH (Weis, Austria).

The crude oil was first heated in a 2-L pyrex bottle at 60° C. in the water bath and was homogenized by vigorous manual shaking, then was left on the bench at room temperature without any disturbance for 5 months.

After the 5-month time period, 40-mL aliquots were taken from the upper phase and from the bottom phase, called "upper phase" and "lower phase" respectively.

The resulting samples were analysed by LC-MS as described above for their precursor content. The effect of long term settling on the precursor levels is shown in FIG. 18.

The same samples were also subjected to heat treatment in ampoules in order to simulate the formation of MCPDEs and were analysed by LC-MS for their MCPDE content accordingly. The benefits of the long term settling on the resulting MCPDE levels are shown in FIG. 19.

Example 9

Long-Term Settling of Solvent Extracted Crude Sunflower Oil

Production of solvent extracted crude sunflower seed oil is described above.

1 L of this crude oil was subjected to long term settling trial by leaving it on the bench at room temperature without any disturbance for 5 months.

After the 5-month time period, 40-mL aliquots were taken from the upper phase and from the bottom phase, called "upper phase" and "lower phase" respectively.

The resulting samples were analysed by LC-MS as described above for their precursor content. The effect of long term settling on the precursor levels is shown in FIG. 20.

The same samples were also subjected to heat treatment in ampoules in order to simulate the formation of MCPDEs and were analysed by LC-MS for their MCPDE content accordingly. The benefits of the long term settling on the resulting MCPDE levels are shown in FIG. 21.

All publications mentioned in the above specification are herein incorporated by reference. Various modifications and variations of the disclosed methods, uses and products of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. A method for purification of a triacylglyceride oil, wherein a quantity of organic chlorinated precursors of monochloropropandiol esters (MCPDEs) is reduced in the purified triacylglyceride oil compared to the triacylglyceride oil, the method comprising:
    (a) concentrating insoluble components in a liquid triacylglyceride oil by
        (i). applying a centrifugational force on the liquid triacylglyceride oil whilst maintaining a temperature of the liquid triacylglyceride oil above a melting temperature of the triacylglyceride oil; and
        (ii). allowing the insoluble components to settle by gravitational force whilst maintaining the temperature of the liquid triacylglyceride oil above the melting temperature of the triacylglyceride oil; and
    (b) separating the liquid triacylglyceride oil from the insoluble components.

2. The method of claim 1 comprising, before step (a), melting the triacylglyceride oil by heating the triacylglyceride oil to above the melting temperature of the triacylglyceride oil.

3. The method of claim 1, wherein step (a)(ii) is performed, and then step (a)(i) is performed.

4. The method of claim 1, wherein step (a)(i) is performed, and then step (a)(ii) is performed.

5. The method of claim 1, wherein the triacylglyceride oil comprises an oil selected from the group consisting of a plant oil, an animal oil, a fish oil, an algal oil, and mixtures thereof.

6. The method of claim 5 wherein the triacylglyceride oil comprises a palm oil or fractions obtained from the palm oil.

7. The method of claim 5 wherein the triacylglyceride oil comprises a sunflower oil or high oleic variants of the sunflower oil.

8. The method of claim 1 comprising adjusting a pH of the triacylglyceride oil before step (a) to increase the polarity of the organic chlorinated precursors of MCPDEs.

9. The method of claim 1 further comprising the following steps subsequent to step (b):
    (c) one or more processes selected from the group consisting of physical or chemical refining, degumming, neutralization and bleaching.

10. The method of claim 1, wherein the liquid triacylglyceride oil comprises segregated droplets and sediments.

11. The method of claim 9 further comprising the following steps subsequent to step (c):
    (d) deodorizing a product of step (c); and/or
    (e) fractionating a product of step (c) or (d).

12. The method of claim 9 further comprising vacuum steam deodorizing a product of step (c) subsequent to step (c).

* * * * *